(12) United States Patent
Voss

(10) Patent No.: US 9,409,619 B2
(45) Date of Patent: Aug. 9, 2016

(54) BICYCLE TENSIONING DEVICE

(71) Applicant: Darrell W. Voss, Vancouver, WA (US)

(72) Inventor: Darrell W. Voss, Vancouver, WA (US)

(*) Notice: Subject to any disclaimer, the term of this patent is extended or adjusted under 35 U.S.C. 154(b) by 0 days.

(21) Appl. No.: 13/839,168

(22) Filed: Mar. 15, 2013

(65) Prior Publication Data

US 2014/0265227 A1   Sep. 18, 2014

(51) Int. Cl.
*B60B 35/00* (2006.01)
*B62K 21/02* (2006.01)
*B60B 27/02* (2006.01)
*B62K 25/02* (2006.01)

(52) U.S. Cl.
CPC ............... *B62K 21/02* (2013.01); *B60B 27/026* (2013.01); *B62K 2025/025* (2013.01)

(58) Field of Classification Search
CPC ..................................................... B60B 27/026
USPC .............................. 301/124.2; 280/278, 281.1
See application file for complete search history.

(56) References Cited

U.S. PATENT DOCUMENTS

| | | | |
|---|---|---|---|
| 8,382,415 B1 | 2/2013 | Goldbaum | |
| 8,449,045 B2* | 5/2013 | Ashman | 301/124.2 |
| 2007/0145814 A1* | 6/2007 | D'Aluisio | 301/111.06 |
| 2011/0133543 A1* | 6/2011 | Ashman | 301/124.2 |
| 2013/0033096 A1 | 2/2013 | Howes | |
| 2013/0049322 A1* | 2/2013 | Rose et al. | 280/279 |
| 2013/0241271 A1* | 9/2013 | Lim | 301/124.2 |

FOREIGN PATENT DOCUMENTS

| | | |
|---|---|---|
| GB | 2414971 A | 12/2005 |
| WO | 2006138699 A2 | 12/2006 |

OTHER PUBLICATIONS

Patent Cooperation Treaty Written Opinion of the International Searching Authority for PCT/US2014/026443, Applicant: Darrell W. Voss, Document Date: Sep. 15, 2015, European Patent Office, Munich, Germany.
Patent Cooperation Treaty International Preliminary Report on Patentability (Chapter I of the Patent Cooperation Treaty) for PCT/US2014/026443, Applicant: Darrell W. Voss, Document Date: Sep. 15, 2015, The International Bureau of WIPO, Geneva, Switzerland.
Patent Cooperation Treaty International Search Report for PCT/US2014/026443, Applicant: Darrell W. Voss, Document Mailing Date: Sep. 5, 2014, European Patent Office, Rijswijk, NL.

* cited by examiner

*Primary Examiner* — Anne Marie Boehler
*Assistant Examiner* — Marlon Arce
(74) *Attorney, Agent, or Firm* — Stone Creek Services LLC; Alan M Flum

(57) ABSTRACT

A tensioning device for bicycle front and rear wheel assemblies. A skewer assembly with a thumbnut is securable to the wheel assembly with a quick-release assembly. Portions of the skewer assembly are removable from the quick-release assembly by turning the thumbnut a partial turn, such as a quarter of a turn. Removal of the skewer assembly allows the front wheel to be removed. In another embodiment, the skewer assembly is able to be removed by turning the quick-release assembly by a partial turn, such as a quarter of a turn.

64 Claims, 18 Drawing Sheets

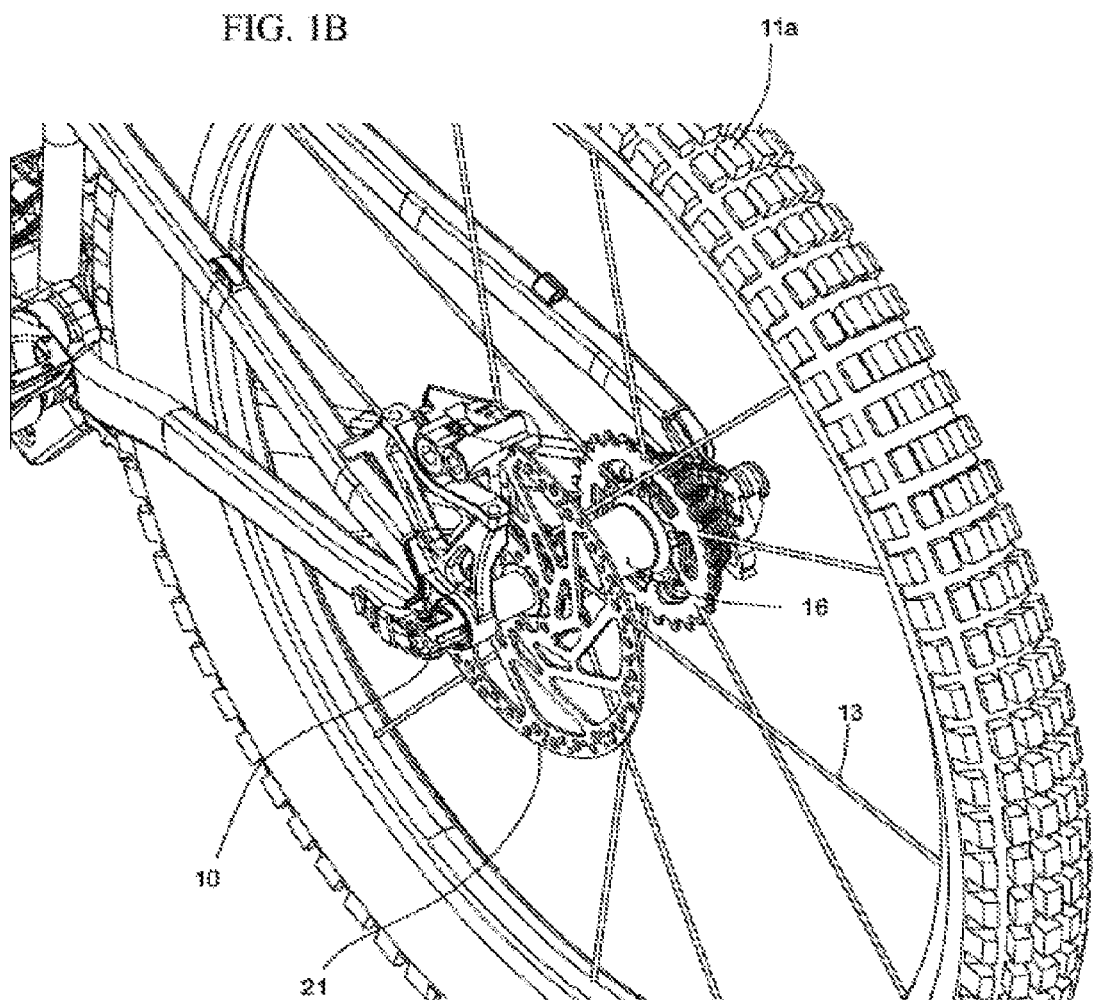

BICYCLE TENSIONING DEVICE

FIELD OF THE INVENTION

The field of the invention relates generally to tension clamping members for a bicycle. The invention relates more particularly to a quick-release skewer assembly for securing a bicycle wheel.

BACKGROUND OF THE INVENTION

Bicycle quick-release mechanisms are utilized to allow a bicycle wheel to be quickly disconnected from the bicycle frame for repair, maintenance, securement to a bike rack, or shipping when the bicycle is not in use. Bicycle wheel quick-release ("QR") mechanisms are available for both the front and rear wheels. Conventional quick-release mechanisms utilize a quick-release lever assembly located on one side of one of the bicycle dropout either front or back. The term "dropout" herein refers to the wheel mount at the fork or rear of the bicycle, whether an open slot or a capturing hole for the axle to be secured within.

The quick-release lever assembly attaches to one end of a skewer shaft. The other end of the skewer shaft is attached to a manually operated nut. In use, to remove a bicycle front wheel, the quick-release lever is operated to an open position. In the open position, the skewer assembly is not clamped to the front forks of the bicycle. To completely remove the bicycle front wheel, in some common designs, the nut on the end of the skewer opposite the QR lever must be loosened at least several turns. The bicycle wheel is then able to be removed by removing the wheel from downwardly oriented dropout slots in the forks. Note that the design is called a "quick-release", but the secondary retention devices require that the nut be unscrewed extensively such that it really is not quick. This design also has the disadvantage of the wheel hub axle not being captivated in through-holes in the forks. Due to this disadvantage, the front wheel of a bicycle with this type of quick-release design has the potential to fall-off the dropout slots in the forks if an inadequate clamping force of the skewer assembly to the front forks is applied by operation of the quick-release lever of the quick-release assembly. This is of particular concern where disc brakes, in lieu of rim brakes, are utilized. On rim brakes, the moment arm from the axle is much greater and is about the same as the radius of the wheel, so the applied braking force at the rim is relatively small. However, on disc brakes, which are located proximal the hub axle, the moment arm about the axle is much smaller than the radius of the wheel, so the applied forces on the wheel brake disc by the brake pads are much larger. Also, these applied forces by the brake pads may be oriented in a generally downward direction, if the brake pads are mounted aft of the lower portion of the forks. Due to this, there is a potential for bicycle front wheels with disc brakes and downwardly oriented dropout slots to have the front wheel come-off during use of the bicycle, particularly when the tool less quick-release assembly has not been properly adjusted to provide an adequate clamping force. Breakage of the drop-out tabs and/or the jacking out of the axle from the vehicle frame member may also result during use, potentially causing injury to the rider. Due to this risk, instead of using conventional open dropout slots, some bicycle structures have through-holes instead of dropout slots. However, this drop-out design requires the skewer rod to be removed from the fork through the through-holes in order to remove the wheel. To facilitate this, a manually operated nut may be attached to the skewer rod, which may be threaded into the quick-release assembly. The manually operated nut in this type of fork design must be unscrewed completely to allow the skewer rod to be disengaged from the component it is threaded into. Once this occurs, the skewer rod is removed, which allows the bicycle front wheel to be removed from the front forks (and parts to be lost). To reinstall the front wheel, the bicycle wheel is placed between the front forks and the manually operated nut with the attached skewer rod is threaded into the appropriate component. However, the unscrewing or loosening, and tightening of the manually operated nut while also properly locating the wheel between the forks may be difficult to accomplish consistently and adequately. In addition, the thread engagement of the skewer rod to the component the skewer rod threads into must be of a proper length in order to provide a proper clamping force of the QR skewer assembly to the forks when the quick-release lever is closed. Adequate and consistent tension with the nut and skewer is not always obtained, especially by an inexperienced user.

Accordingly, a need exists in the art for a bicycle wheel quick-release skewer assembly that utilizes vehicle dropouts or rear mounts with through-holes instead of dropout slots that easily allows a bicycle wheel to be removed from the dropouts and reinstalled to the without having to loosen (and completely remove in some instances) and tighten a manually operated nut attached to the tensioning member. A need also exists in the art for a bicycle quick-release mechanism that utilizes through-holes instead of dropout slots that allows for reinstallation of the bicycle front or rear wheel that does not require precise hand tightening of the manually operated nut in order to achieve a proper clamping force of the bicycle quick-release skewer assembly.

SUMMARY OF THE INVENTION

The present invention solves the above need in the art to not require loosing of a manually operated nut in order to remove a skewer rod and precise tightening of a manually operated nut in order to reinstall a skewer rod for frame designs utilizing through-holes instead of dropout slots to retain the wheel hub to the wheel mount either the forks or the rear mount. This need is satisfied by use of a quick-release skewer assembly. The quick-release skewer assembly only requires a portion of a complete turn, such as quarter turn of a manually operated thumbnut to remove or reinstall the skewer rod in one embodiment. In another embodiment, a quick-release lever only requires a portion of a turn, such as a quarter turn, to remove or reinstall the tensioning member. The present invention also allows for precise regulation of the clamping force applied to the left and right forks by the quick-release skewer assembly. The invention may also be used with front or rear dropout type mountings to provide an easier mount procedure and more consistent clamping force.

In one embodiment, a front portion of a bicycle includes a hub assembly and a skewer assembly; the skewer assembly includes a rotatable fastener, such as an end nut or a thumbnut. The front portion of the bicycle also includes a quick-release assembly. The skewer assembly is selectively engagable to the quick-release assembly by selectively aligning opposing threaded portions of the skewer assembly and the quick-release assembly. Portions of the skewer assembly may be removed from the quick-release assembly and the left and right forks by turning the thumbnut from a second angle that is relative to the quick-release assembly to a first angle that is relative to the quick-release assembly. The first and second angles are relative angles because the thumbnut is turned or rotated relative to the quick-release assembly. The difference between the first and the second angles is approximately a quarter of a turn, After rotating the thumbnut from the second angle to the first angle, the clamping force is released by opening the quick-release lever.

In another embodiment, a front portion of a bicycle includes a fork assembly; the fork assembly including a left fork leg and a right fork leg. The front portion of the bicycle further includes a hub assembly, a skewer assembly, and a quick-release assembly. The quick-release assembly includes a quick-release lever. The skewer assembly is selectively threadably engaged to a right fork bushing by selectively aligning opposing threaded portions of the skewer assembly and the right fork bushing. The right fork bushing is threaded into a hole in a lower portion of the right fork leg. The skewer assembly is capable of being removed from the right fork bushing by turning the quick-release lever a of a turn about the axis of the axle?.

In a further embodiment, a front portion of a bicycle includes a fork assembly; the fork assembly including a left fork leg and a right fork leg, the fork assembly including a through-hole in a lower portion of the left fork leg and a lower portion of the right fork leg, the left and right fork legs each including a slot in an inboard side of the lower portion of the left and right fork legs. The front portion of a bicycle includes a hub assembly, the hub assembly including a left end portion that is configured with opposing flat caps (shaped as washers or discs) and a right end portion of the hub assembly is configured with opposing caps. The front portion of a bicycle additionally includes a skewer assembly, the skewer assembly including a skewer rod, the skewer rod being installed within the through-holes in the lower portion of the left fork leg and right fork leg and a quick-release assembly. The left end portion of the hub with opposing caps allows the left end portion to be received in the left fork slot, the right end portion of the hub with opposing flat spots allows the right end portion of the hub assembly to be received in the right fork slot. The front wheel is not capable of being removed from the fork assembly without the skewer rod being removed from the through-holes in the lower portion of the left and right fork legs.

In use, the quick-release lever is operated to orient the quick-release lever from a closed orientation in which the quick-release (QR) skewer assembly is clamped to the front forks, to an open orientation in which the QR assembly is not clamped to the front forks. In one embodiment, a thumbnut in contact with the right fork leg is rotated a partial turn (approximately one-quarter turn) to allow the skewer assembly to be removed from the wheel hub assembly and from through-holes in the front forks. Reinstallation is the reverse of the above. In another embodiment, a quick-release lever proximal the fork leg is rotated a partial turn (e.g., one-quarter turn) to allow the skewer assembly to be removed from the wheel hub assembly and from through-holes in the front forks. Reinstallation is the reverse of the above. The same applies to the rear dropouts.

BRIEF DESCRIPTION OF THE DRAWINGS

Preferred and alternative examples of the present invention are described in detail below with reference to the following drawings:

FIG. 1B is a rear close-up isometric view of the rear wheel showing the QR lever securing the rear axle in place;

DETAILED DESCRIPTION OF THE PREFERRED EMBODIMENT

Figure 1A:
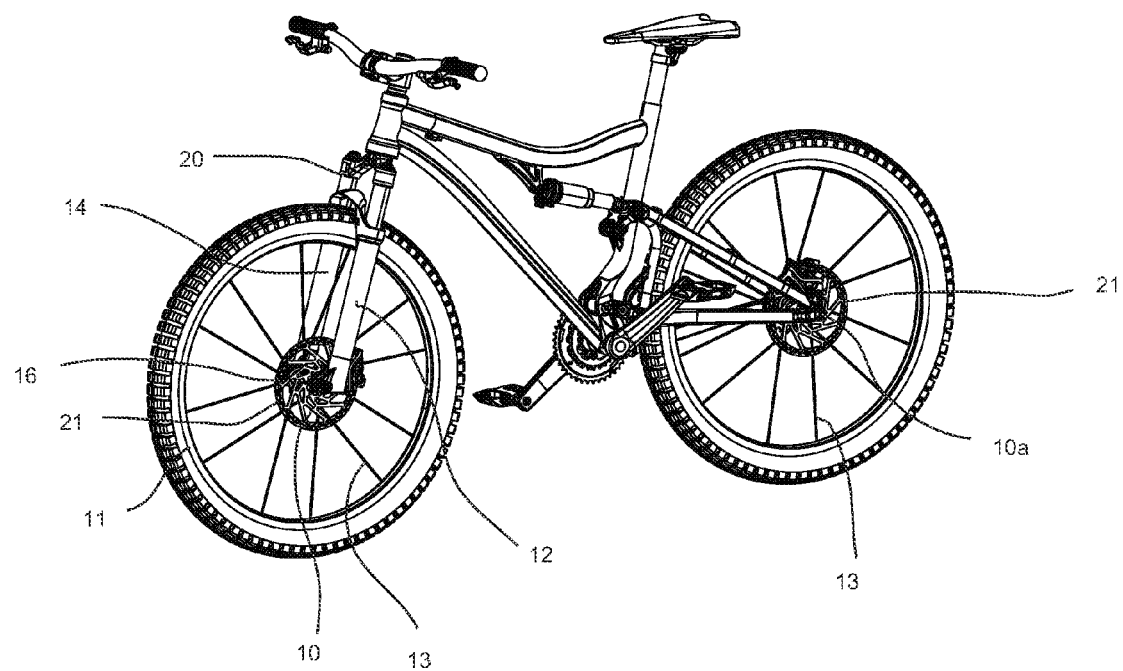
FIG. 1A illustrates an isometric view of a bicycle, including the tensioning members according to an embodiment.

FIGS. 1A and B illustrate a bicycle having disc brakes, dropouts, and QR levers front and rear. The bicycle includes a quick-release skewer (i.e., tension rod assemblies) assemblies 10, 10a, a front wheel 11, rear wheel 11a, a hub assemblies 16 (partially hidden behind the brake discs in FIG. 1A), and a fork assembly 20. The front portion of the bicycle further includes a bicycle left fork leg 12, a bicycle right fork leg 14, bicycle spokes 13 and brake discs 21.

Figure 2A:
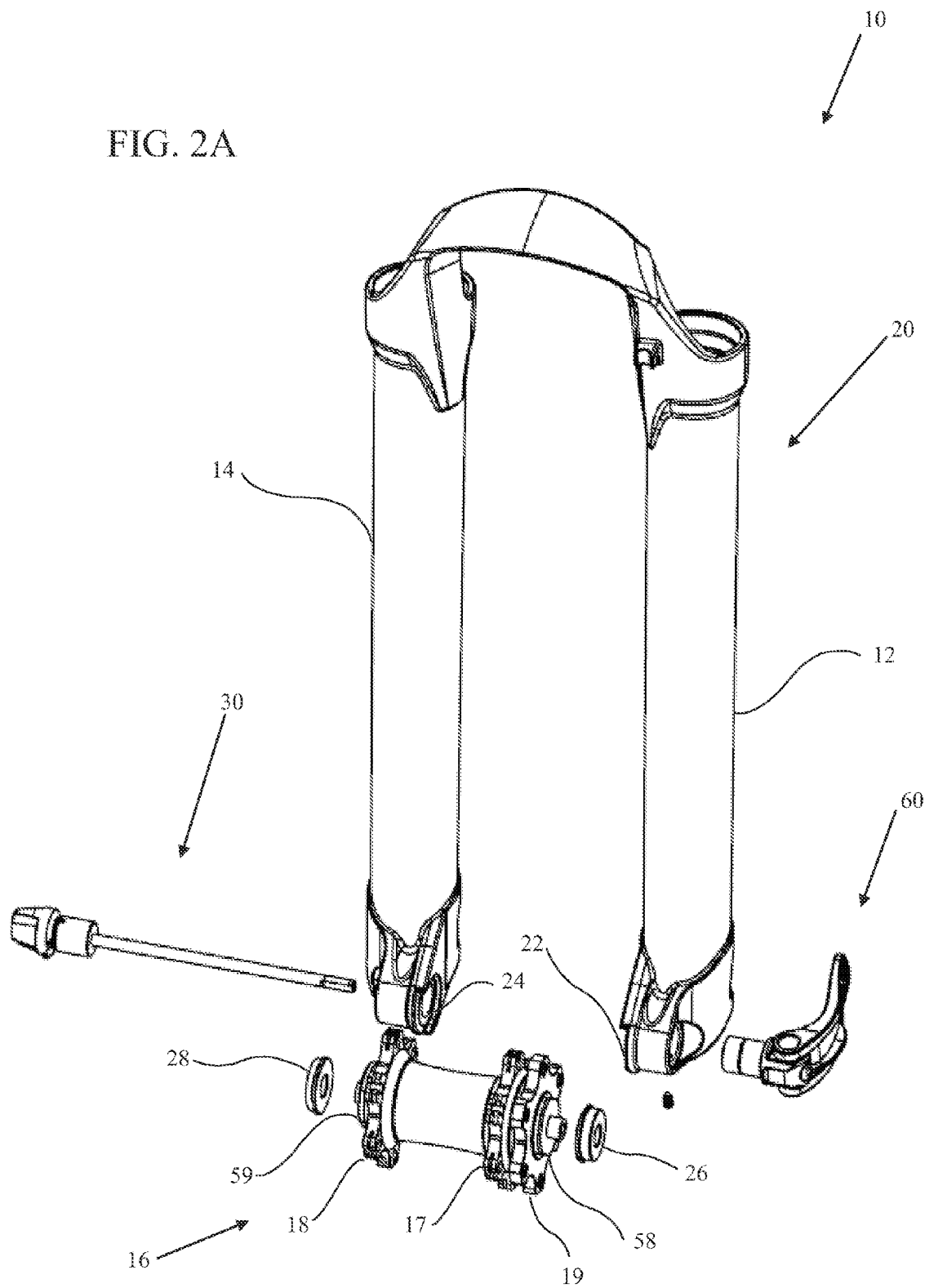
FIG. 2A illustrates an isometric view of a quick-release assembly and skewer rod assembly removed from the front fork of a bicycle according to an embodiment.

FIG. 2A illustrates an isometric view of a quick-release skewer assembly 10 and a fork assembly 20 looking toward a rear direction according to an embodiment. The quick-release skewer assembly of FIGS. 2 through 5 is primarily intended for hub assemblies 16 with a 9 mm axle, but the embodiments of FIGS. 2-5 are not limited to this size axle. As illustrated in FIG. 2, the quick-release skewer assembly 10 is mounted to a bicycle left fork leg 12 and a bicycle right fork leg 14. Located between the left bicycle fork leg 12 and the right bicycle fork leg 14 is the wheel hub assembly 16. The wheel hub assembly 16 includes a rotating portion, which rotates with the front wheel tire, brake disc, and spokes, and a non-rotating portion, which is mounted to the left 12 and right 14 fork legs. The rotating and non-rotating portions of the wheel hub assembly 16 are separated by bearings (not shown).

The left bicycle fork leg 12 includes a horizontal slot 22 on an inboard side of the left fork leg 12. The right bicycle fork leg 14 includes a horizontal slot 24 on an inboard side of the right fork leg 14. The slot on the left fork leg 22 and the slot on the right fork leg 24 are oriented in a forward direction. The left 22 and right 24 slots mate with end caps 26, 28 that are positioned against opposing flat surfaces 58, 59 on each end of the non-rotating portion of the wheel hub assembly 16. The end caps are essentially discs or washers the help disperse the load from the hub to the fork over a broader area. The also do not rely solely on shear to hold the hub in place, as they fit within the forwardly extending recesses or slots 22, 24. The forward orientation of the slots counters the load placed upon the axle and hub by the brakes being applied to the brake discs. As the brakes are applied the tire, wheel, and spokes pull the hub rearwardly into the slots. The resultant forces on the brake disc also pull the hub downwardly and/or rearwardly. In either case, the slots resist the forces and spread the load to the end caps 26, 28.

The wheel hub assembly 16 includes left 17 and right 18 spoke flanges for attaching wheel spokes 13 (FIG. 1) to the wheel hub assembly 16. The wheel hub assembly 16 further includes a disc brake flange 19 for attaching a brake disc 21 (FIG. 1) to the disc brake flange 19. Located generally within the hub assembly 16 is a skewer rod assembly 30. Located outboard of the left bicycle fork leg in FIG. 2 is a quick-release (QR) assembly 60 (i.e. a tension-release device). A left end cap 26 with opposing flat spots abuts the left end portion of the hub assembly 16 and is mounted in the left fork leg slot 22. A right end cap 28 with opposing flat spots abuts the right end portion of the hub assembly 16 and is mounted in the right fork slot 14 as discussed above.

Figure 2B:
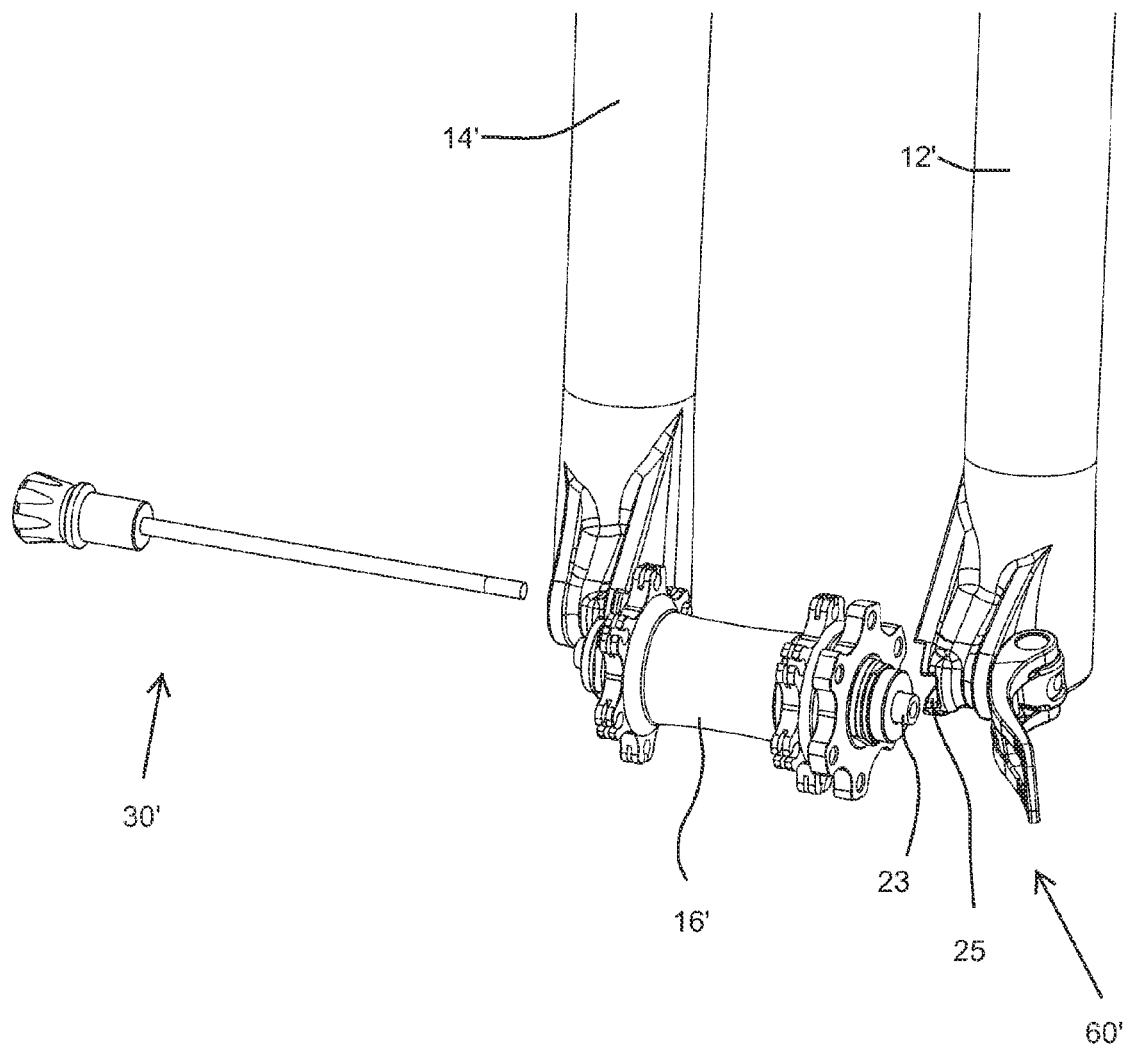
FIG. 2B shows another version of a QR assembly with the tensioning rod released from the QR lever to remove the hub.

FIG. 2B is similar. Note that the slots in the fork legs accommodate longer axles 23 within inset recesses or slots 25. This form of the assembly can accommodate conversion of previous hub and axle assemblies to the improved arrangement with better handling of the braking forces.

Figure 3:
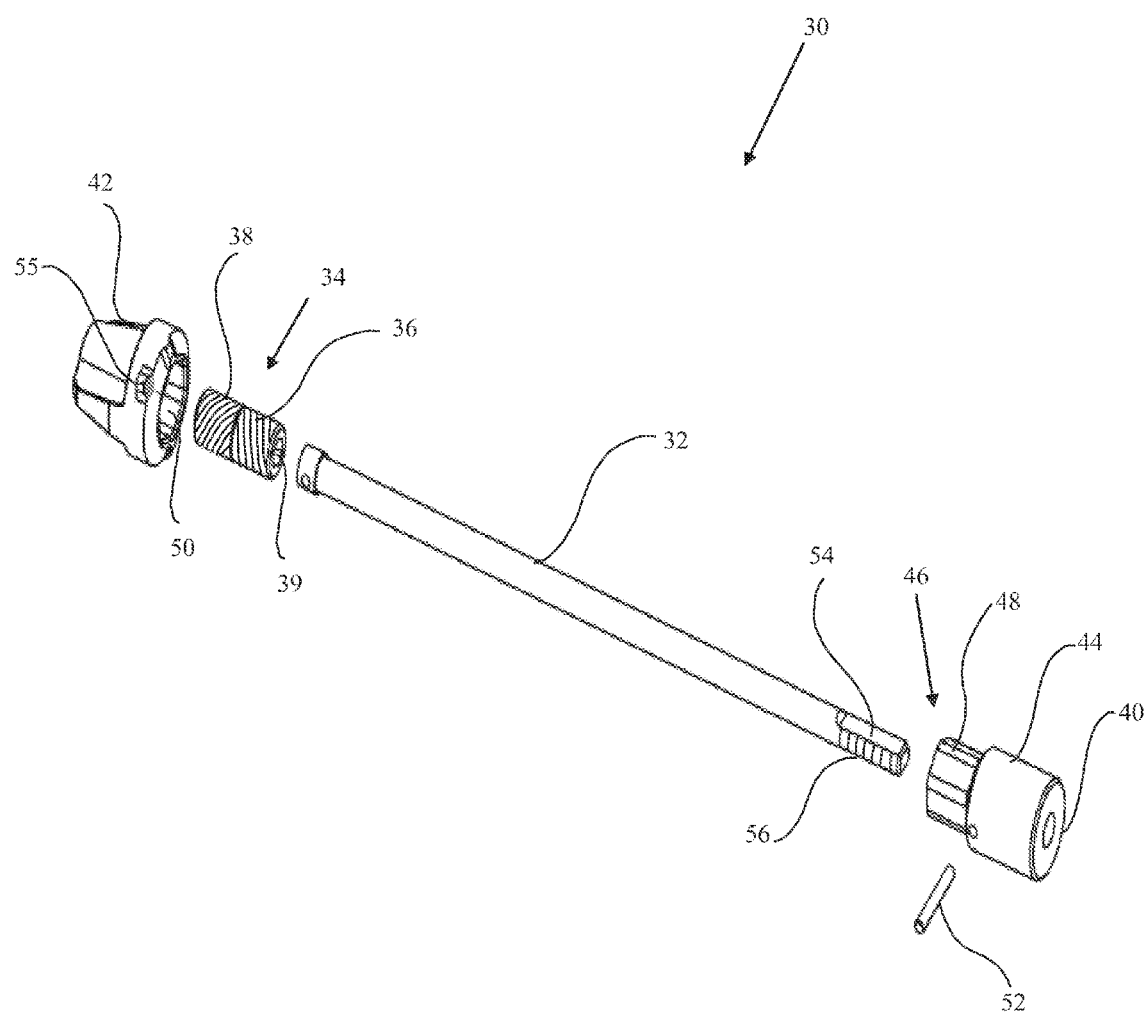
FIG. 3 illustrates an exploded isometric view of the skewer rod assembly according to an embodiment.

FIG. 3 illustrates an exploded isometric view of the skewer rod (i.e., tension rod) assembly 30 according to an embodiment of the present invention. As illustrated in FIG. 3, the skewer assembly 30 includes a skewer rod 32. The skewer rod 32 is installed through a through-hole in the left 12 and right 14 fork legs and within a through-hole in an axle of the wheel hub 16. In FIG. 3 an end of the skewer rod 32, which is installed proximal the right fork leg 14, abuts against an adjusting cylinder 34. The adjusting cylinder 34 illustrated has external threads on an inboard portion 36 of the adjusting cylinder 34. The adjusting cylinder 34 has external threads on an outboard portion 38 of the adjusting cylinder 34. The threads on the inboard portion 36 and outboard portion 38 may be either left-handed, or right-handed. The external threads on the inboard portion 36 of the adjusting cylinder 34 allows the adjusting cylinder 34 to be threaded into a threaded bore in an outboard portion 46 of an adjusting sleeve 40. The external threads on the outboard portion 38 of the adjusting cylinder 34 allow the adjusting cylinder 34 to be threaded into a threaded bore on a thumbnut 42 (i.e. an end nut). A hex through-hole 39 in the adjusting cylinder 34 allows an Allen wrench to be inserted through a hole in an outboard end of the thumbnut 42 into the hex hole 39 in the adjusting cylinder 34 to adjust the amount of thread engagement of the external threads on the inboard portion 36 of the adjusting cylinder 34 to the threaded bore in the outboard portion 46 of the adjusting sleeve 40. The adjusting cylinder 34 may be installed so that the inboard portion 36 and outboard portion 38 is reversed from the orientation shown in FIG. 3. The adjusting sleeve 40 has an inboard portion 44 in addition to the outboard portion 46. The inboard portion 44 of the adjusting sleeve fits inside the through-hole (FIG. 2) in the right fork leg 14. The outboard portion 46 of the adjusting sleeve 40 has an outer surface configured as wide and narrow flats 48. The wide and narrow flats 48 forming a hexagonal outer surface on the adjusting sleeve 40 outboard portion 46 fit into mating wide and narrow flats 50 forming a hexagonal inner surface of the thumbnut 42. Accordingly, when the thumbnut 42 is rotated, the adjusting sleeve 40 is also rotated. As illustrated in FIG. 3, a pin 52 secures the adjusting sleeve 40 to the skewer rod 32. Therefore, when the thumbnut 42 is rotated, the skewer rod 32 also rotates. The end of the skewer rod 32 opposite the thumbnut in FIG. 3 has flats 54 on opposing sides of an outer surface of the end of the skewer rod 32. The same end of the skewer rod 32 in FIG. 3 also has threaded circumferential portions 56 (i.e. an array of teeth or engaging members) on opposing sides of an outer surface of the end of the skewer rod 32. FIG. 3 also illustrates a protrusion 55 on an outer surface of the thumbnut.

Figure 4:
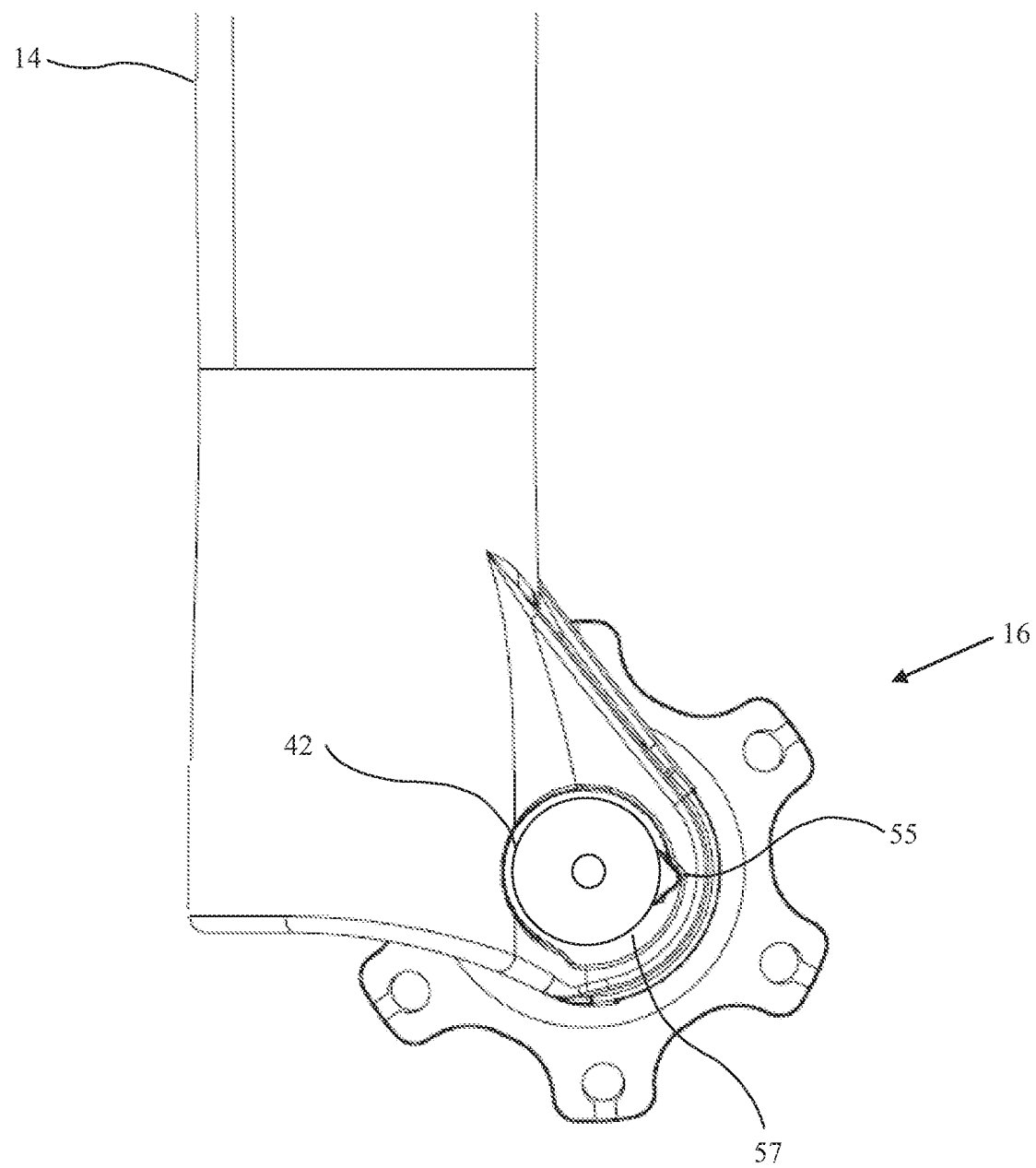
FIG. 4 illustrates a detail view of a lower portion of the right fork leg and a portion of the thumbnut looking inward according to an embodiment.

FIG. 4 illustrates a detail view of a lower portion of the right fork leg 14 and a portion of the thumbnut 42 looking inward according to an embodiment. As illustrated in FIG. 4, a protrusion 55 exists on an outer circumference of the thumbnut 42. As illustrated in FIG. 4, the protrusion 55 is located within a circumferential recess 57 on an outboard side of a lower portion of the right fork leg. The protrusion 55 on the outer circumference of the thumbnut 42 acts in cooperation with the circumferential recess 57 on the right fork leg to prevent the thumbnut 42 from being rotated more than a quarter turn in a preferred embodiment. The reason for not allowing the thumbnut 42 to turn more than a quarter turn will be explained further in the description of FIG. 5 below.

Figure 5:
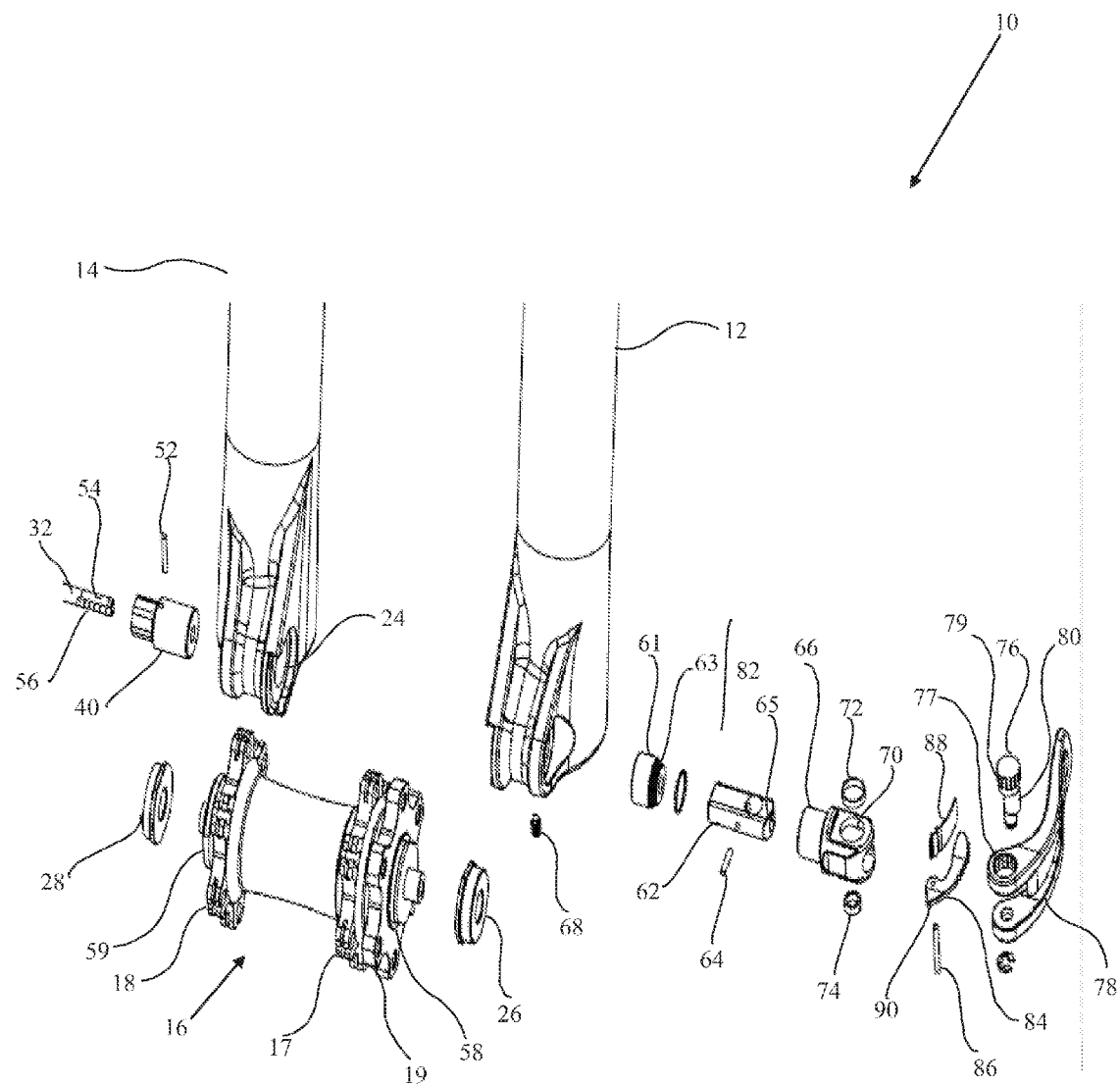
FIG. 5 illustrates an exploded isometric view of the quick-release assembly according to an embodiment.

FIG. 5 illustrates an exploded isometric view of the quick-release assembly 60 according to an embodiment. As illustrated in FIG. 5, the end of the skewer rod 32 in FIG. 3 with flats 54 and threaded circumferential portions 56 on opposing sides of an outer surface of the skewer rod 32 engages a partially threaded bore in a partially internally threaded block 62. The end of the skewer rod 32 in FIG. 3 with flats 54 and threaded circumferential portions 56 is installed through a through-hole in the left fork bushing 61 into the partially threaded bore of the partially internally threaded block 62. The skewer rod 32 is oriented in the bore with the flats 54 of the skewer rod 32 aligned with the opposing threaded portions of the partially internally threaded block 62 such that it slides past the threaded bore portions without interference. A pin 64, inserted into the partially internally threaded block 62 and that protrudes into the bore, acts as a stop to allow the end of the skewer rod 32 to be inserted into a proper depth of partially threaded bore of the partially internally threaded block 62. This proper depth insertion of the skewer rod 32 assures that the quick-release skewer assembly 10 is properly clamped to the left 12 and right 14 fork legs. Rotating the thumbnut 42 and attached skewer rod 32 causes a relative angle between the thumbnut 42/skewer rod 32 and the partially internally threaded block 62 to vary from a second angle to a first angle. As a result, the threaded circumferential portions 56 on the skewer rod 32 threadably engage the opposing threaded portions of the partially internally threaded block 62. As also illustrated in FIG. 5, the partially internally threaded block 62 is matingly housed within a hole 65 in the housing 66. The partially internally threaded block 62 is free to move axially within the hole 65 of the partially internally threaded cylinder housing 66. However, the block 62 cannot rotate axially within the housing 66 as the square cross section of the block 62 mates with the internally square hole 65. An outboard threaded land 63 on the left fork bushing 61 threads into a threaded portion of an inboard portion of the hole 65 in the housing 66. A set screw 68 prevents relative motion between the housing 66 and the left fork leg 12 by the set screw threading into the left fork leg 12 and the left fork bushing 61.

FIG. 5 also illustrates the housing 66 has a vertical through bore 70 in which upper 72 and lower 74 bushings are installed and in which a camshaft 76 rotates. The camshaft 76 is inserted through a serrated hole 77 in a quick-release (QR) lever 78. A serrated land 79 on a top portion of the camshaft 76 engages the serrated hole 77 in the QR lever. The serrated land 79 engagement with the serrated hole 77 in the QR lever 78 causes the camshaft 76 to rotate when the QR lever 78 is operated. A cam 80 on the camshaft 76 rides in a hole 82 in the partially internally threaded block 62. In operation, when the QR lever 78 is operated, the cam 80 is caused to rotate about the upper 72 and lower 74 bushings installed in the housing 66. This rotation of the cam 80 in the hole 82 in the partially internally threaded block 62 causes the partially internally threaded block 62 to follow the cam 80 rotational movement. The cam 80 rotational movement causes the block 62 to move in an axial direction. As the outer surface of the right side of the skewer rod 32 is threadably engaged to the opposing threaded portions of the partially internally threaded block 62, the skewer rod 32 is also caused to move axially. This axial movement of the skewer rod 32 causes a clamping force of the skewer rod assembly 30 and QR assembly to the right 12 and left fork legs 14 be selectively applied and relieved. A QR lever locking lever 84 is pivotally mounted on a QR lever locking lever pin 86. A pointed end 90 of the QR lever locking lever 84 is biased against the housing 66 by a leaf spring 88. The biasing of pointed end 90 of the QR lever locking lever 84 against the housing 66 by the leaf spring 88 prevents the QR lever 78 from being operated if the locking lever 84 is not depressed. By operating the QR lever locking lever, the pointed end 90 of the QR lever locking lever 84 is no longer in contact with the housing 66 and the QR lever 78 is free to be operated. This locking lever 84 functions as a backup safety feature. The locking lever 84 may be omitted in some embodiments such that the cam action is relied upon to retain the QR lever in the closed configuration.

Figure 6:
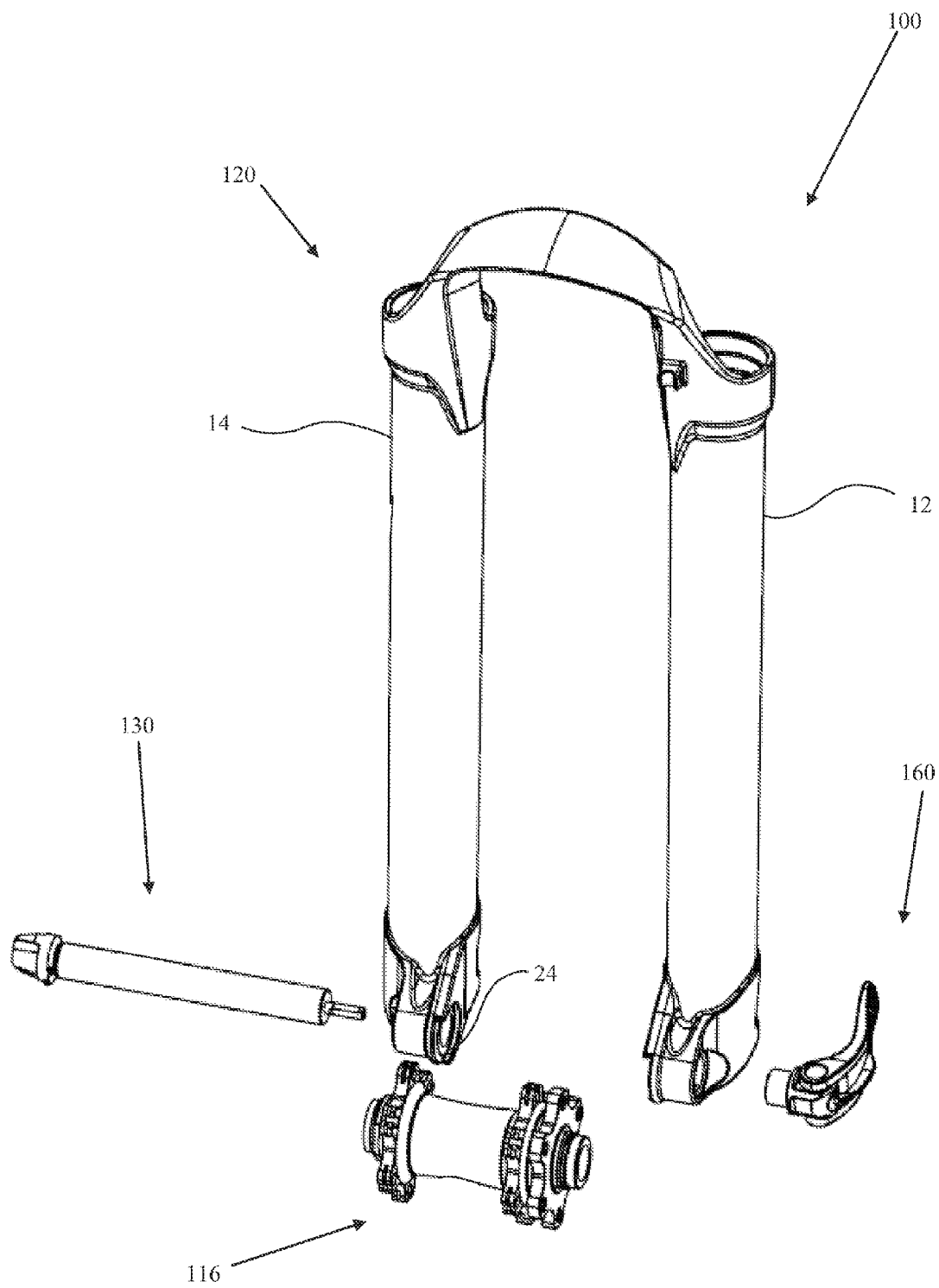
FIG. 6 illustrates an isometric view of a quick-release skewer assembly removed from the forks and hub adjacent the front fork of a bicycle according to another embodiment.
Figure 7:
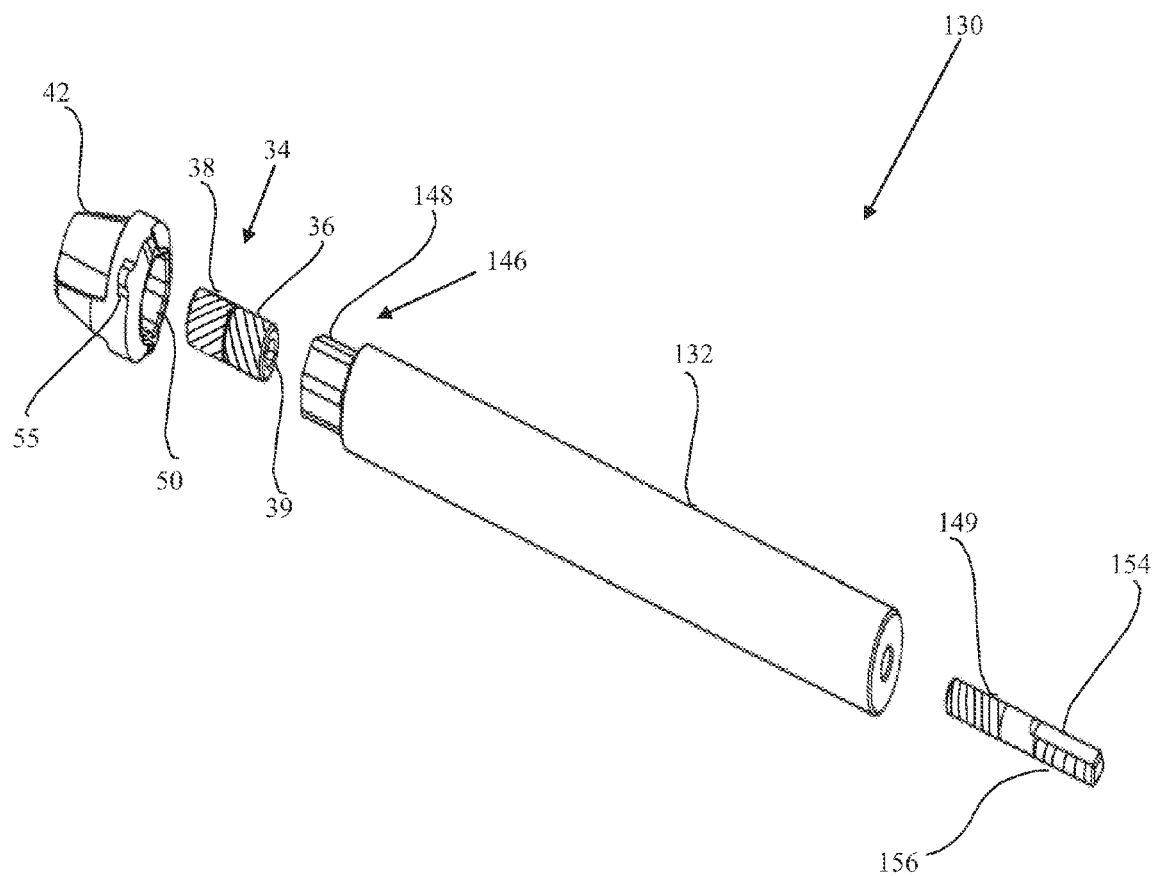
FIG. 7 illustrates an exploded isometric view of the skewer rod assembly according to an embodiment.

FIG. 6 illustrates an isometric view of a quick-release skewer assembly 100 looking toward a rear direction of a bicycle according to another embodiment. The quick-release skewer assembly 100 of FIGS. 6-8 is primarily intended for hub assemblies 116 with a 15 mm axle, but the embodiments of FIGS. 6-8 are not limited to this size axle. The description of the quick-release skewer assembly 100 of FIG. 6 is the same, for the most part as FIG. 2, so parts that are the same as described in FIG. 2 will not be described again. The main difference between the quick-release skewer assembly 10 of FIG. 2 and the quick-release skewer assembly 100 of FIG. 6 is that the quick-release skewer assembly 100 of FIG. 6 does not utilize the left end cap 26 and right end cap 28 as illustrated in FIG. 2. This is due to the fact that since the quick-release skewer assembly 100 of FIG. 5 utilizes a larger axle, the larger axle distributes transmitted forces to the left 12 and right 14 fork legs over a larger area, hence there is no need for the left 26 and right 28 end caps that are used in FIG. 2 to distribute forces over a larger area from the smaller axle of FIG. 2. Also, as described below in the description of FIG. 7, the skewer rod assembly 130 of the embodiment of FIG. 3 has some differences in design from the skewer rod assembly 30 of the embodiment of FIG. 3. FIG. 6 also illustrates the fork assembly 120 and the quick-release assembly 160.

FIG. 7 illustrates an exploded isometric view of the skewer rod assembly 130 according to an embodiment. In FIG. 7, parts that are the same as in FIG. 3 will not be again described, unless they are attached to a part that is different from FIG. 3. In addition, parts in FIG. 7 that are the same as in FIG. 3 will utilize the same reference number. As illustrated in FIG. 7, the skewer assembly 130 includes a skewer rod 132. The skewer rod 132 is installed through a through-hole in an axle of the wheel hub 116. In FIG. 7 an end of the skewer rod 132 that is installed proximal the right fork leg 14 abuts against an adjusting cylinder 34. The adjusting cylinder 34 illustrated has external threads on an inboard portion 36 of the adjusting cylinder 34. The adjusting cylinder 34 has external threads on an outboard portion 38 of the adjusting cylinder 34. The threads on the inboard portion 36 and outboard portion 38 may be either left-handed, or right-handed. The external threads on the inboard portion 36 of the adjusting cylinder 34 allows the adjusting cylinder 34 to be threaded into a threaded bore in the skewer rod 132. The external threads on the outboard portion 38 of the adjusting cylinder allows the adjusting cylinder 34 to be threaded into a threaded bore on a thumbnut 42. A hex through-hole 39 in the adjusting cylinder 34 allows an Allen wrench to be inserted into the hex hole 39 through a hole in an end of the thumbnut 42 to adjust the amount of thread engagement of the external threads on the inboard portion 36 of the adjusting cylinder 34 to the threaded bore in the skewer rod 132, thus adjusting the relative position of the rod 132 to the thumbnut 42. The adjusting cylinder 34 may be installed so that the inboard portion 36 and outboard portion 38 is reversed to the orientation shown in FIG. 7. An outboard portion 146 of the skewer rod 132 proximal the right fork leg 14 has an outer surface configured as wide and narrow flats 148. The wide and narrow flats 148 on an outer surface of the skewer rod 132 outboard portion 146 fit into mating wide and narrow flats 50 on an inner surface of the thumbnut 42. Accordingly, when the thumbnut 42 is rotated, the skewer rod 132 is also rotated. A threaded shaft 149 is threadably engaged into a threaded bore on the end of the skewer rod 132 in FIG. 7. As also illustrated in FIG. 7, the end of the threaded shaft 149 has flats 154 on opposing sides of an outer surface of the end of the threaded shaft 149. The end of the threaded shaft 149 in FIG. 7 also has threaded circumferential portions 156 on opposing sides of its outer surface.

Figure 8A:
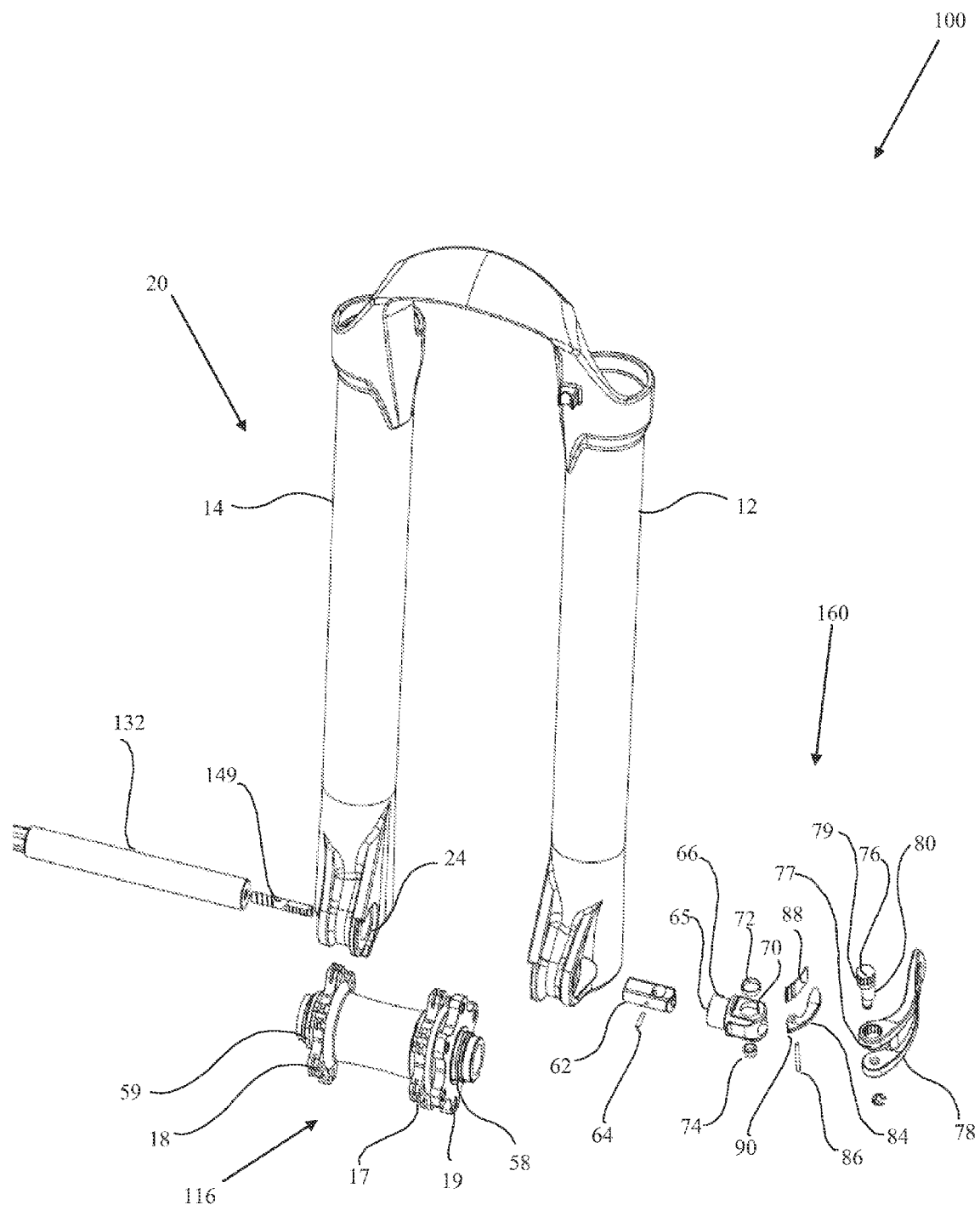
FIG. 8A illustrates an exploded isometric view of the quick-release assembly according to an embodiment with a 15 mm axle.

FIG. 8A illustrates an exploded isometric view of the quick-release assembly 160 according to an embodiment. The description of the quick-release assembly 160 is virtually identical to FIG. 5, so the parts of the quick-release assembly 60 of FIG. 5 that are the same in FIG. 8 will not be descried again. The only difference between the quick-release assembly 60 of FIG. 5 and the quick-release assembly 160 of FIG. 8 is that a threaded smaller shaft 149 threadingly engages the partially internally threaded block 62, instead of the skewer shaft 32 directly threadingly engaging the partially internally threaded block 62, as was taught by FIG. 3. The protrusion 55 on the thumbnut 42, which is located within the circumferential recess 77 on the right fork leg as taught by FIG. 4, also applies to the embodiment of FIGS. 6-8.

Figure 8B:
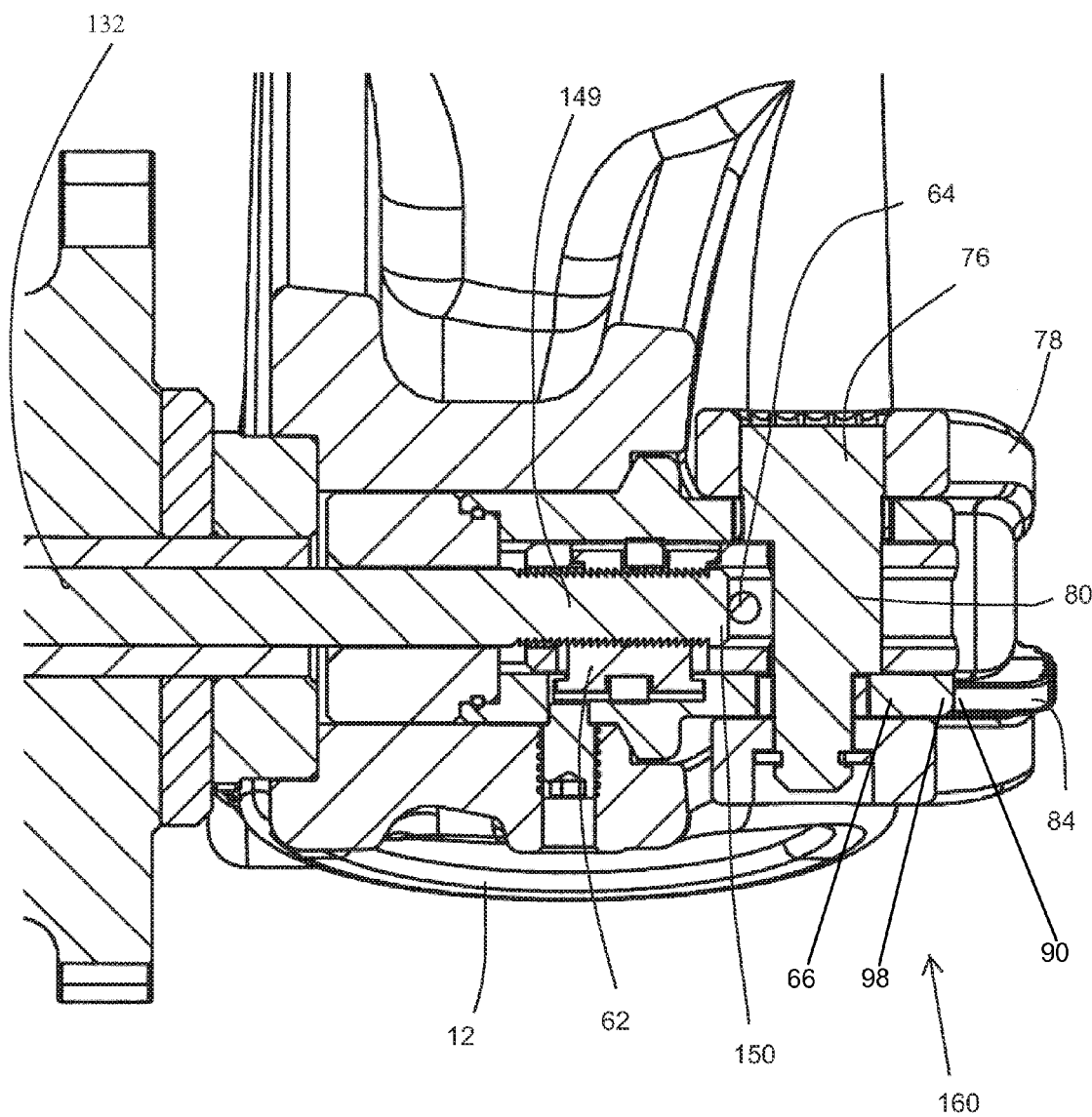
FIG. 8B is a close-up cross-sectional view of the QR assembly securing the end of a tensioning rod.

FIG. 8B shows the parts in a close-up cross-sectional view of the attachment of the tension rod (skewer rod 132) to the second embodiment of the QR assembly 160. Note that the end of the threaded shaft 149 of the skewer rod 132 includes a non-threaded head 150. This head helps ensure that the skewer rod 132 is inserted all the way. The rod will not turn relative to the QR assembly 160 if the head does not extend past the complementary threads in the threaded cylinder 62. Thus, upon insertion, the end of the rod 132 abuts pin 64. At this point, head 150 clears the threads of the cylinder 62 such that the rod can be turned a partial turn (preferably a quarter turn) to engage the treads. A pointed end 90 of QR locking lever 84 is biased against the curved or cammed longitudinal surface 98 of housing 66 by a leaf spring. The biasing of pointed end 90 of the QR locking lever 84 against the curved surface 98 of housing 66 prevents the QR lever 78 from being operated if the locking lever 84 is not depressed.

Figure 8C:
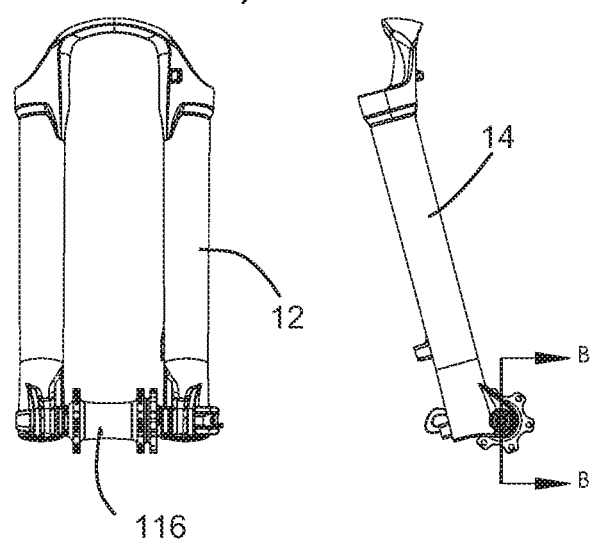
FIG. 8C illustrates orthographic view of the assembly and cross-section of an embodiment with a 15 mm axle.
Figure 8C:
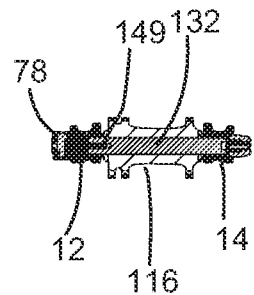

FIG. 8C illustrates the general assembly of FIGS. 8A and B in an assembled configuration in the fork and hub.

Figure 9:
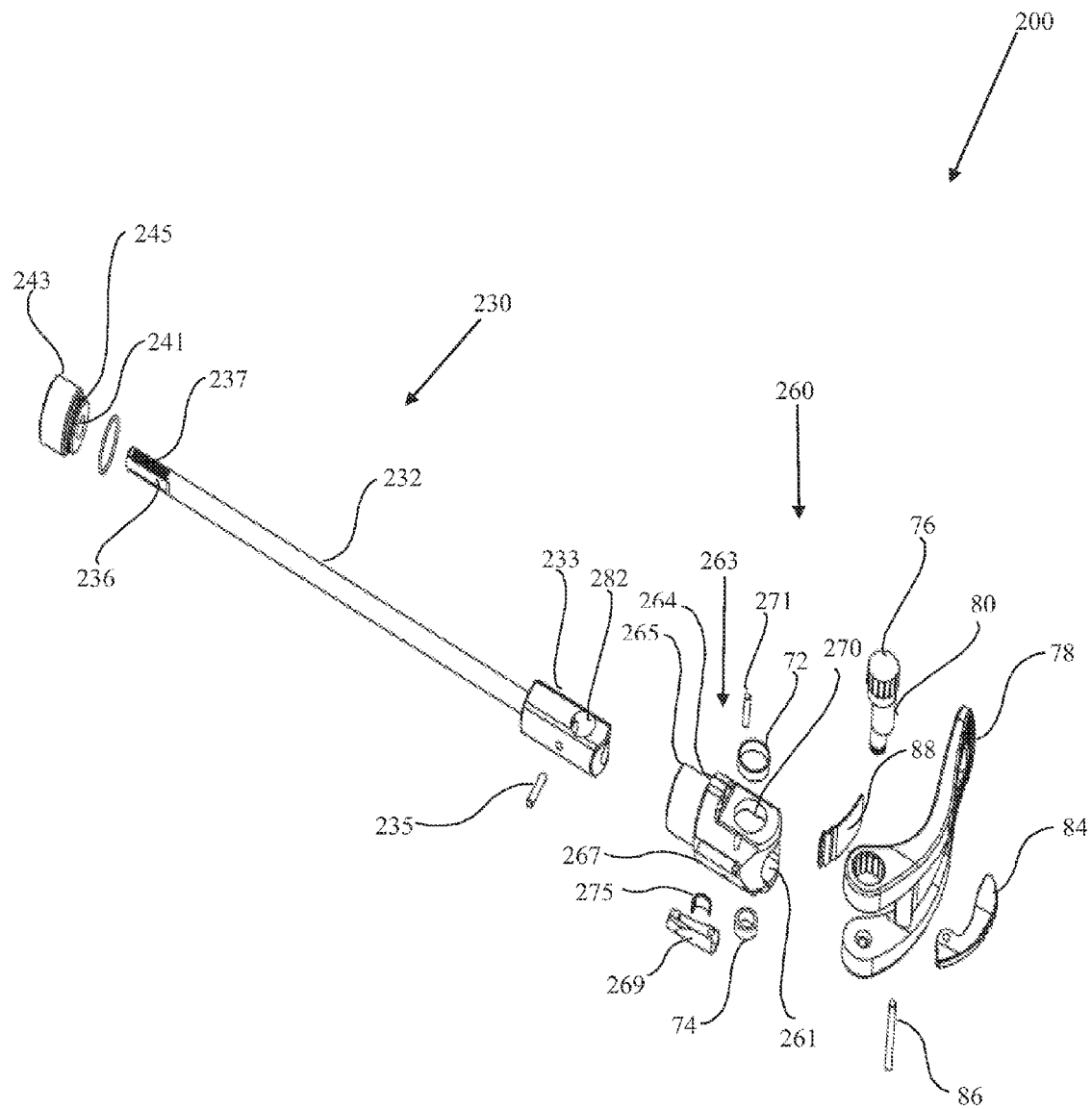
FIG. 9 illustrates an isometric view of a quick-release skewer assembly according to another embodiment in which the tensioning rod is fastened to the QR lever.

FIG. 9 illustrates an isometric view of a quick-release (QR) skewer assembly 200 according to another embodiment. The quick-release skewer assembly 200 of FIGS. 9 and 10 is for an embodiment in which the QR assembly 260 is removed with the skewer assembly 230 through the left fork leg 12 to allow the bicycle wheel removal. This is in contrast to the embodiments of FIGS. 2-5 and 6-8 in which the skewer assembly 30 of FIGS. 2-5 and the skewer assembly 130 of FIGS. 6-8 is removed through the right fork leg 14 with the thumbnut 42.

As illustrated in FIG. 9, a skewer assembly 230 of a QR skewer assembly 200 includes a skewer rod 232. A rectangular-shaped cam follower 233 is attached to the end of the skewer rod 232 in FIG. 9 by a pin 235. On the opposite end of the skewer rod 232 in FIG. 9 is located an end portion with opposing flats 236 and opposing circumferential threaded portions 237. The opposing flat 236 and circumferentially threaded portions 237 on the end portion of the skewer rod 232 in FIG. 9 is selectively engagable to opposing threaded portions in the thumbnut situated on the outer side of the right fork (not shown).

Figure 10A:
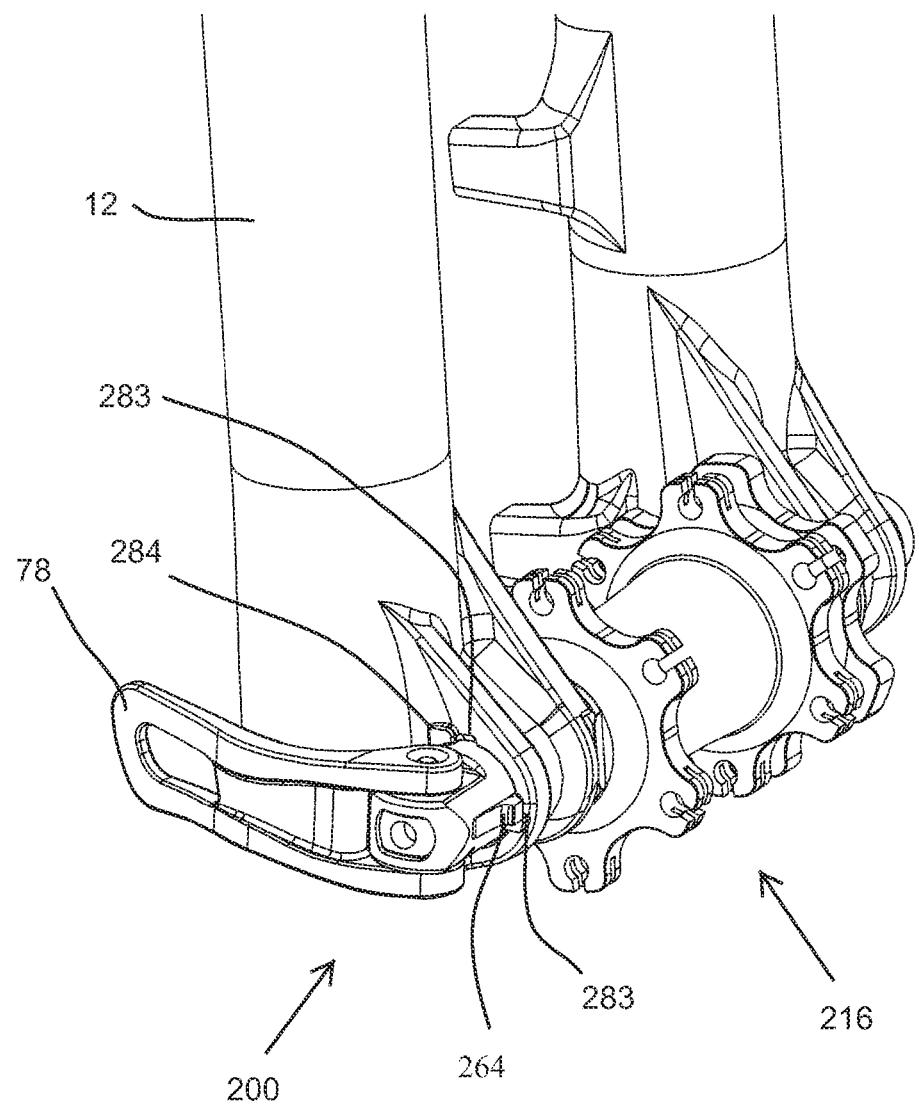
FIG. 10A illustrates the quick-release lever in a closed orientation according to an embodiment.

FIG. 9 also illustrates the quick-release assembly 260 according to an embodiment. The description of the quick-release assembly 260 illustrated in FIG. 9 is the same in many respects to the quick-release assembly 60 of FIG. 5, so the parts that are described in FIG. 5 and are the same in FIG. 9 will generally not be described again. As illustrated in FIG. 9, the rectangular-shaped cam follower 233 attached to the end of the skewer rod 232 by pin 235 fits into a rectangular-shaped hole 261 in a cam follower housing 263. The cam follower housing 263 includes a round inboard portion 265 and a rectangular outboard portion 267. The round inboard portion 265, along with the end cap 243 threaded thereto, is installed within a bore (FIG. 2) on the right fork bushing 243. A lever 269 is mounted by a pin 271 into a groove 273 in a side of the rectangular outboard portion 267 of the cam follower housing 263. A spring 275 biases the lever 269 outward. The lever 269 is biased into a groove in the left fork leg 12 to retain the cam follower housing 263 to the groove in the left fork leg 12. A protrusion 264 on an outer surface of the cam follower housing 263 is located within a circumferential recess 283 (FIG. 10A) in the left fork leg 12. The cam follower housing 263 has a through bore 270 in which upper 72 and lower 74 bushings are installed and in which a camshaft 76 rides. A cam 80 on the camshaft 76 rides in a hole 282 in the rectangular-shaped cam follower 233. In operation, when the QR lever 78 is operated, the cam 80 is caused to rotate about the upper 72 and lower 74 bushings installed in the cam follower housing 263. This rotation of the cam 80 causes the rectangular-shaped cam follower 233 to follow the cam 80 rotational movement. The cam 80 rotational movement causes the cam follower 233 and attached skewer rod 232 to move in an axial direction. This axial movement of the skewer rod 232 causes a clamping force of the skewer rod assembly 30 and QR assembly to the right 12 and left fork legs 14 to be selectively applied and relieved. FIG. 10A illustrates the QR lever 78 in the closed position with a clamping force applied by the QR skewer assembly 200. FIG. 10A also illustrates the outwardly biased protrusion 264 on the cam follower housing and the recesses 283 into which the protrusion drops to stop excessive rotation of the QR lever 78. Alternatively a recess along the circumferential region of the desired turn of the lever may be used along with a tab or nub on the QR housing is used. A stop tab 284 is also used to positively locate the end of the lever turn.

Figure 10B:
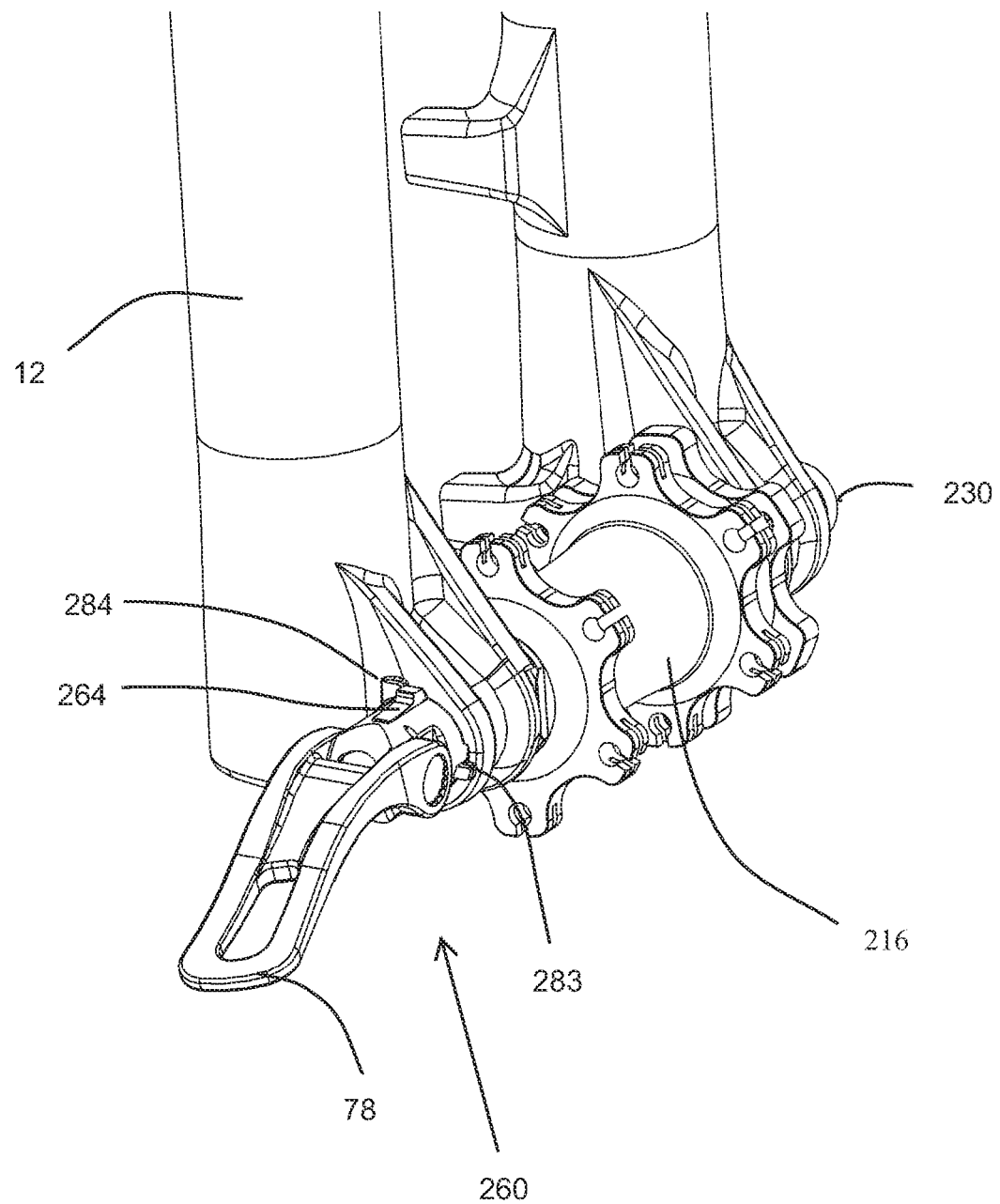
FIG. 10B illustrates the quick-release lever in an open orientation according to an embodiment.
Figure 10C:
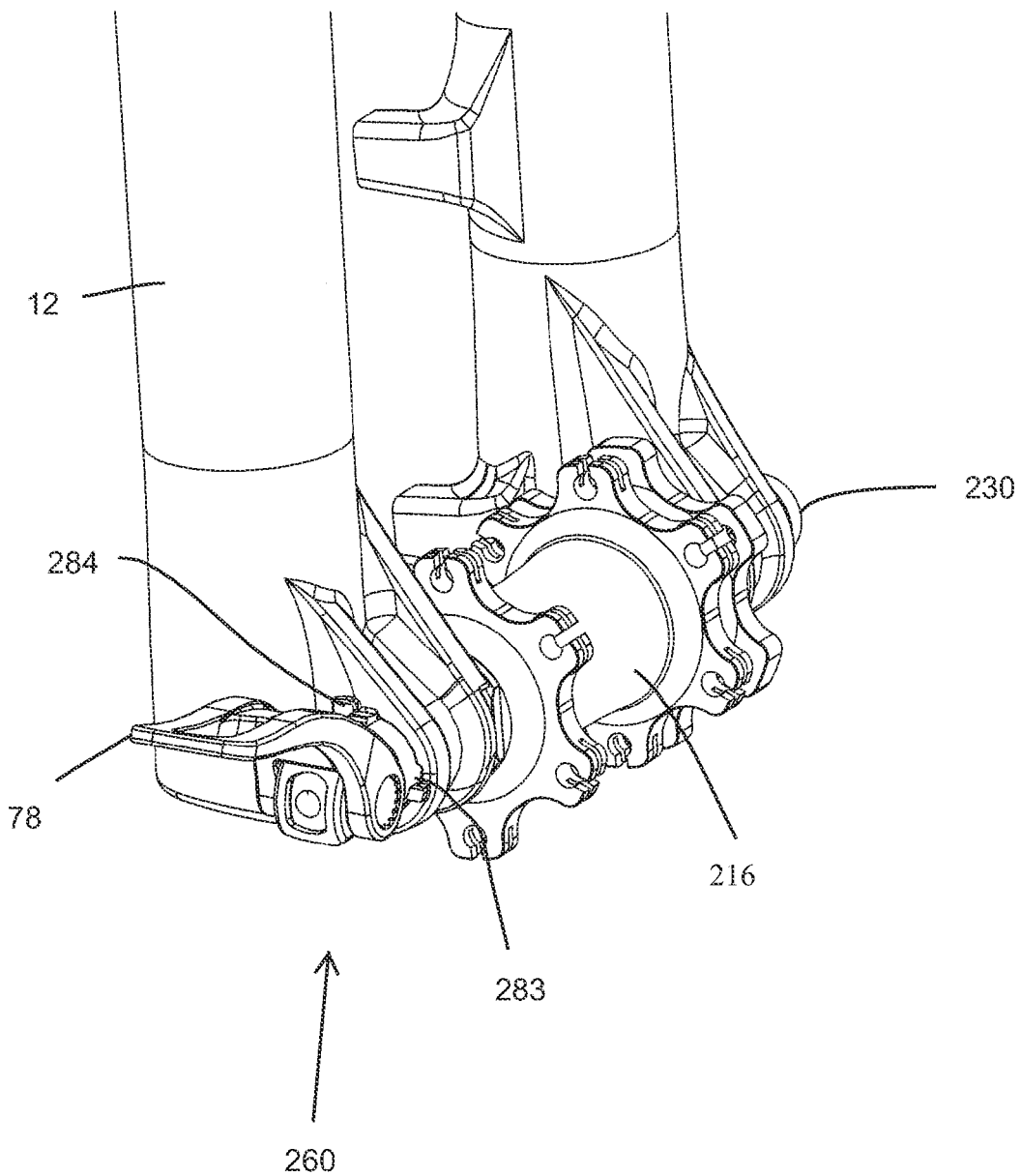
FIG. 10C illustrates the quick-release lever in release orientation according to an embodiment.

FIG. 10B illustrates the QR lever 78 in the open position with the clamping force applied by the QR skewer assembly 200 relieved. Once the clamping force is relieved the QR assembly 260 and the skewer assembly 230 may be rotated 90 degrees so the QR lever is oriented vertically as illustrated in FIG. 10C. When the QR assembly 260 and the skewer assembly 230 is rotated 90 degrees, the relative angle between the QR assembly 260/skewer assembly 230 and the right fork bushing 243 varies from a first angle to a second angle. Thus, the skewer rod 232 opposing flat and circumferentially threaded portions are aligned so that the opposing circumferentially threaded portions are not engaged with the opposing threaded portions (i.e. engaging portions) in the bore 241 on the right fork bushing 243. In this orientation, the skewer assembly 230 and the QR assembly 260 may be removed from the hub assembly 216 and the wheel may be removed from the bicycle.

In use of the embodiments of FIGS. 2-5, a user operates the QR lever 78 from a closed position, in which a clamping force is applied by the QR skewer assembly 10 to the left 12 and 14 fork legs in order to retain the QR shaft assembly and the wheel 11 to the left 12 and right 14 fork legs, to an open position, in which the clamping force is relieved. Once the clamping force is relieved, the thumbnut 42 is rotated 90 degrees in order to disengage the threaded circumferential portions 56 on opposing parts of an outer surface of the right side of the skewer rod 32 from the opposing threaded portions in the partially internally threaded hole in the partially internally threaded block 62. Once the opposing threaded portions in the skewer rod 32 and the partially internally threaded block 62 are disengaged, the threaded nut 42 and the skewer rod assembly 30 may be removed from the hub assembly 16. Once the threaded nut 42 and the skewer rod assembly 30 are removed, the wheel 11 may then be removed from the front fork legs 12, 14. Reinstallation of the wheel is the reverse of the above. The protrusion 55 on the thumbnut 42, which moves within the circumferential recess 57 in a lower outboard portion of the right fork leg 14, prevents the thumbnut 42 from being rotated more than 90 degrees in order to assure that the skewer rod 32 flats 54 are aligned with the threaded portion in the partially internally threaded block 62. This alignment allows the skewer rod 32 to be removed from the partially internally threaded block 62. Reinstallation of the wheel 11 is the reverse of the above. In order to assure a proper clamping force of the QR skewer assembly 10 to the left 12 and right 14 fork legs, an Allen wrench may be inserted through a hole in an end of the thumbnut 42. The Allen wrench engages the hex through-hole 39 in the adjusting cylinder 34. By turning the Allen wrench engaged in the hex through-hole 39 in the adjusting cylinder 34, the distance along a longitudinal axis of the adjusting cylinder 34 between the thumbnut 42, which clamps to the right fork leg 14 and the partially internally threaded cylinder housing 66, which clamps to the left fork leg 12 may be increased, to decrease the clamping force, or decreased, to increase the clamping force. The embodiment of FIGS. 6-8 operates in a similar manner. One difference of the embodiment of FIGS. 6-8 with the embodiment of FIGS. 2-5 is that the embodiment of FIGS. 6-8 does not utilize an adjusting sleeve 40 (FIG. 3) in the skewer assembly 30. Instead, the function of the adjusting sleeve 40 of FIG. 3 has been incorporated into the skewer rod 132 of FIG. 7 in the embodiment of FIGS. 6-8. The other difference between the embodiment of FIGS. 2-5 and 6-8 is that the opposing flats 54 and threaded circumferential 56 portions on the right side of the skewer rod in FIG. 3 have been replaced in FIG. 7 with a separate threaded shaft 149 with opposing flats 54 and threaded circumferential 56 portions that mate into the partially internally threaded block 62.

In use of the embodiments of FIGS. 9 and 10, a user operates the QR lever 78 from a closed position (FIG. 10A), in which a clamping force is applied by the QR skewer assembly 200 to the left 12 and 14 fork legs in order to retain the QR skewer assembly 200 and the wheel 11 to the left 12 and right 14 fork legs, to an open position (FIG. 10B), in which the clamping force is relieved. Once the clamping force is relieved, the QR lever 78 is rotated 90 degrees (FIG. 10C) in order to disengage the threaded circumferential portions 237 on opposing parts of the skewer rod 232 in FIG. 9 from the opposing threaded portions in the 241 on the right fork bushing 243. Once the opposing threaded portions on the skewer rod 232 and in the bore 241 on the right fork bushing 243 are disengaged, the QR lever 78 and the skewer rod assembly 230 may be pulled-out of the hub assembly 16 and the front fork legs 12, 14. Once the QR lever 78 and the skewer rod assembly 230 are removed, the wheel 11 may be removed from the front fork legs 12, 14. Reinstallation of the wheel is the reverse of the above. The protrusion 264 on the cam follower housing 263, which moves within the circumferential recess 283 (FIG. 10A) in the left fork leg 12, prevents the QR lever 78 from being rotated more than 90 degrees in order to assure that the opposing flats 236 on skewer rod 232 is aligned with the opposing circumferential threaded portions in the bore 241 in the right fork bushing 243 so the skewer rod 232 may be removed from the right fork bushing 243. Reinstallation of the wheel 11 is the reverse of the above. In order to assure a proper clamping force of the QR skewer assembly 200 to the left 12 and right 14 fork legs, the length of thread engagement of the partial circumferential threaded portions 237 on the skewer rod 232 and the partially threaded portions in the bore 241 of the right fork bushing 243 may be varied. By varying this length of thread engagement, the distance between the right fork bushing 243, which clamps to the right fork leg 14 and the cam follower housing 263, which clamps to the left fork leg 12 may be increased, to decrease the clamping force, or decreased, to increase the clamping force.

Figure 11A:
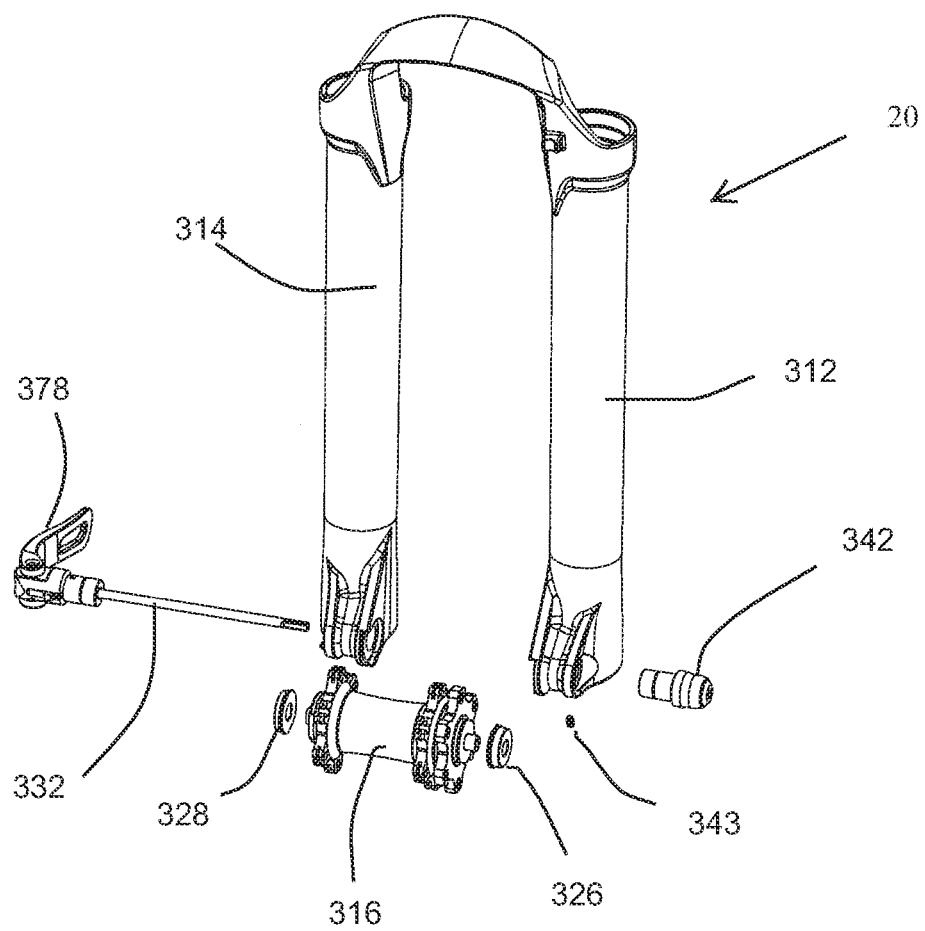
FIG. 11A illustrates another embodiment in a partially exploded view.

FIGS. 11A and B illustrate an alternate embodiment of the QR tension rod assembly of the present invention. In this embodiment, the tension rod 332 is fixed to the QR lever 378. A separate fixed nut 342 is fixed within the fork leg (preferably the left leg 312) and held in place with a setscrew 343 that is fastened through the bottom of the fork leg into the bottom of the nut 342. The QR/tension rod assembly is removed together as it is separated from the fixed nut 342 by a method like that discussed above with regard to FIGS. 10A, B, and C.

Figure 11B:
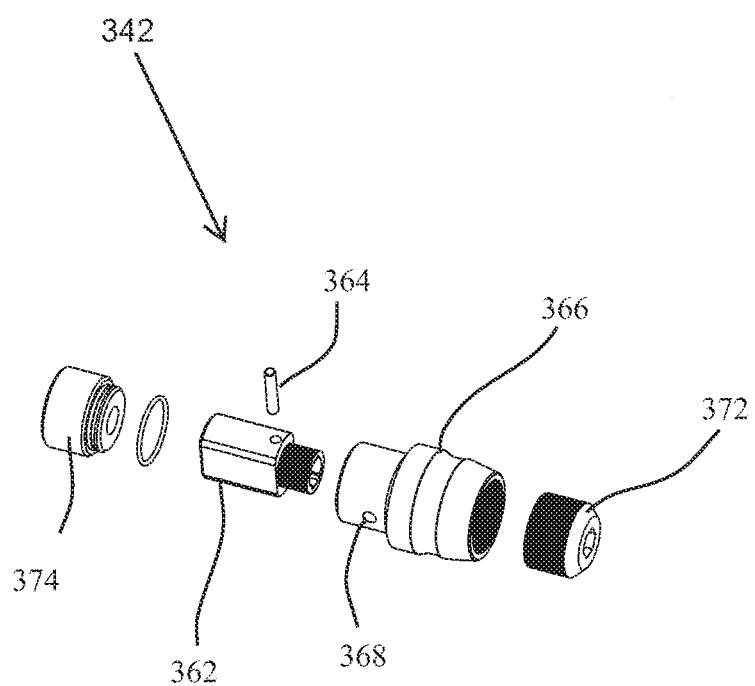
FIG. 11B illustrates the exploded detail of the end attachment to secure the tension member.

FIG. 11B illustrates the parts of fixed nut 342. It includes a cylinder 362 that engages the partially threaded end of the tension rod. A pin 364 stops the insertion of the tension rod to the right depth within the cylinder 362. Housing 366 covers the cylinder (which is actually rectangular in outer cross sectional shape to not rotate within housing 366) and provides the correct shape to mate within the fork leg. Housing 366 includes a hole 368 to receive the set screw. An end screw cap 372 secures to the end of the housing and also fastens the outer end of cylinder 362. An inner cap 374 completes the assembly. It includes an inner aperture to receive the tension rod therethrough.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A portion of a bicycle comprising:
   a wheel mounting assembly including a right and a left arm for securing a right and a left side of a bicycle wheel;
   a hub assembly;
   a tension rod assembly including a rotatable fastener and an array of teeth; and
   a tension-release assembly that includes a camming member configured and arranged to rotate about a camming rotational axis that is substantially transverse to the tension rod assembly;
   wherein the array of teeth of the tension rod assembly is selectively engaged to at least one of the tension-release assembly or the rotatable fastener when a relative angle between the tension rod assembly and the at least one of the tension-release assembly or the rotatable fastener is at a first angle and the array of teeth are disengaged when the relative angle is at a second angle;
   wherein at least portions of the array of teeth of the tension rod assembly are disengaged from at least one of the tension-release assembly or the rotatable fastener and the tension rod assembly is removable from the wheel mounting assembly when at least the relative angle between the tension rod assembly and the at least one of the rotatable fastener or the tension-release assembly is oriented at the second angle; and
   wherein rotating the camming member about the camming rotational axis that is substantially transverse to the tension rod assembly selectively applies a clamping force from the tension-release assembly to at least a portion of the wheel mounting assembly.

2. The portion of the bicycle of claim 1, wherein the tension rod assembly includes an adjusting mechanism located between the rotatable fastener and a skewer rod.

3. The portion of the bicycle of claim 2, wherein the adjusting mechanism includes an adjusting cylinder having right-hand threads on a first side and left-hand threads on a second side that is opposite the first side.

4. The portion of the bicycle of claim 2, wherein the tension-release assembly includes a first array of teeth and the array of teeth of the tension rod assembly are a second array of teeth that extend along an axis of the skewer rod such that the first array of teeth are engagable with the second array of teeth.

5. The portion of the bicycle of claim 4, further comprising a stop member to locate an end of the skewer rod such that the first and the second arrays of teeth are aligned for engagement.

6. The portion of the bicycle of claim 5, wherein the tension-release assembly includes a tension-release lever and the tension-release lever is configured and arranged for a closed position and an open position, wherein in the closed position, the skewer rod and the tension-release assembly are clampable to the right arm and the left arm of the wheel mounting assembly, and in the open position, the skewer rod and the tension-release assembly are not clampable to the left and the right arms of the wheel mounting assembly.

7. The portion of the bicycle of claim 3, wherein one end of the adjusting cylinder is threadably engaged to the rotatable fastener and another end of the adjusting cylinder is threadably engaged to an adjusting sleeve.

8. The portion of the bicycle of claim 3, wherein one end of the adjusting cylinder is threadably engaged to the rotatable fastener and another end of the adjusting cylinder is threadably engaged to a tension member.

9. The portion of the bicycle of claim 1, wherein the array of teeth of the tension rod assembly further includes at least one toothed portion and the tension rod assembly includes at least one non-toothed portion circumferentially adjacent to the at least one toothed portion and recessed radially from the at least one toothed portion, wherein the toothed and non-toothed portions are disposed on an end portion of the tension rod assembly such that the tension rod assembly engagable to portions of a partially internally toothed cylinder by aligning corresponding toothed and non-toothed portions on the end portion of the tension rod assembly with opposing toothed and non-toothed portions in a bore of the partially internally toothed cylinder, and the tension rod assembly is removable from the partially internally toothed cylinder by aligning the non-toothed portion on the end portion of the tension rod assembly with the toothed portions in the bore of the partially internally toothed cylinder.

10. The portion of the bicycle of claim 9, wherein the partially internally toothed cylinder is housed within a hole in a cylinder housing, wherein the partially internally toothed cylinder is configured and arranged to move axially within the cylinder housing.

11. The portion of the bicycle of claim 7, wherein a shifting mechanism is installed in a cylinder housing, wherein the shifting mechanism is movable along an axis of the tension rod assembly by operation of a tension-release lever and axial movement of the shifting mechanism allows the skewer rod to move axially.

12. The portion of the bicycle of claim 1, wherein a first end portion of the hub assembly includes a first end cap and a second end portion of the hub assembly includes a second end cap, the first and the second end caps of the hub assembly are respectively receivable in a first and a second slot in a first and a second lower portion of the wheel mounting assembly.

13. The portion of the bicycle of claim 1, wherein a stop prevents the rotatable fastener from being rotated beyond a quarter turn.

14. The portion of the bicycle of claim 1, wherein the tension rod assembly includes an adjusting member such that adjusting the adjusting member adjusts a length of the tension rod assembly while substantially maintaining the relative angle between the tension rod assembly and the at least on of the tension-release assembly or the rotational fastener.

15. The portion of the bicycle of claim 14, wherein when the tension rod assembly is engaged to the at least one of a tension-release assembly or the rotatable fastener, the tension rod assembly remains engaged when adjusting the adjusting member.

16. The portion of the bicycle of claim 14, wherein when the tension rod assembly is disengaged to the at least one of a tension-release assembly or the rotatable fastener, the tension rod assembly remains disengaged when adjusting the adjusting member.

17. The portion of the bicycle of claim 14, wherein when the tension rod assembly is received by the right and left arms, adjusting the adjusting member adjusts a tension of a tension member.

18. The portion of the bicycle of claim 8, wherein adjusting a thread engagement of the adjusting cylinder adjusts the relative position of the tension member and the rotatable fastener.

19. The portion of the bicycle of claim 18, wherein adjusting the relative position of the tension member and the rotatable fastener adjusts a length of the tension rod assembly while maintaining the relative angle between the tension rod assembly and the at least on of the tension-release assembly or the rotational fastener.

20. The portion of the bicycle of claim 1, wherein a stop prevents the rotatable fastener from being rotated beyond a half turn.

21. The portion of the bicycle of claim 12, wherein the first and the second slots resist a plurality of braking forces and spread a braking load to the first and second end caps.

22. The portion of the bicycle of claim 1, wherein when a braking force is applied to the portion of the bicycle, the wheel mounting assembly absorbs at least a portion of the braking force.

23. The portion of the bicycle of claim 1, wherein when a braking force is applied to the portion of the bicycle, the hub assembly absorbs at least a portion of the braking force.

24. The portion of the bicycle of claim 1, wherein when a braking force is applied to the portion of the bicycle, end caps disperse at least a portion of the braking force from the hub assembly to the wheel mounting assembly.

25. The portion of the bicycle of claim 1, wherein a diameter of an axle of the hub assembly is approximately 9 mm.

26. The portion of the bicycle of claim 1, wherein a diameter of an axle of the tension rod assembly is less than 9 mm.

27. The portion of the bicycle of claim 1, wherein a diameter of an axle of the hub assembly is approximately 15 mm.

28. The portion of the bicycle of claim 1, wherein a diameter of an axle of the tension rod assembly is less than 15 mm.

29. The portion of the bicycle of claim 2, wherein the skewer rod includes a non-teethed portion on a first end, wherein when the skewer rod will not rotate relative to the tension-release assembly unless the non-teethed portion extends beyond a teethed portion of the tension-release assembly.

30. A tensioning system for securing a vehicle wheel to a first dropout and a second dropout of a vehicle having a wheel mounting assembly with a first and a second wheel mounting side and a rear frame member with at least one rear arm, the wheel having a hub assembly, the tensioning system comprising:
    a tensioning member having an engagement portion that includes an array of teeth on a first end and a second end opposite the first end;
    an end nut securable to and positioned on an outboard side of the first dropout; and
    a tension-release device that includes a tension-release lever that is positionable on an outboard side of the second dropout such that each of the first and the second dropouts are positioned intermediate the tension-release lever and the end nut,
    wherein the array of teeth of the tensioning member is selectively engaged to at least one of the end nut or the tension-release device when a relative angle between the tensioning member and the at least one of the end nut or the tension-release device end is at a first angle and the array of teeth is disengaged when the relative angle is at a second angle; and
    wherein the tensioning member is capable of being removed from the dropouts when at least the relative angle between the tensioning member and the at least one of the end nut or the tension-release device is oriented at the second angle, and
    wherein the first end portion of the tensioning member is selectively engagable within the end nut, the array of teeth of the engagement portion of the tensioning member having circumferential engaging members that extend circumferentially around a portion of a side of the tensioning member and over a portion of a length of the engagement portion, the tensioning member also having at least one recessed portion circumferentially adjacent to the engaging members included on the engagement portion, the end nut having another engagement portion that is selectively mateable with the engagement portion of the tensioning member.

31. The system of claim 30, wherein the second end of the tensioning member is coupled to a cam follower, the cam follower being coupled to the tension-release device for axial movement of the tensioning member relative to the tension-release device.

32. The system of claim 31, wherein a cam is coupled to the tension-release device, and wherein the cam is further coupled to the cam follower.

33. The system of claim 30, wherein the first end of the tensioning member is selectively engagable with the tension-release device, the second end being coupled to the end nut, the array of teeth of the engagement portion of the tensioning member having circumferential engaging members that extend circumferentially around a portion of a side of the engagement portion of the tensioning member and over a portion of a length of the engagement portion, the tensioning member also having at least one recessed portion circumferentially adjacent the engagement portion, the tension-release device having another engagement portion that is selectively mateable with the engagement portion of the tensioning member.

34. The system of claim 30, wherein the tension-release device includes a secondary retention member.

35. The system of claim 34, wherein the secondary retention member is a locking lever, the locking lever holding the tension-release lever closed until the locking lever is opened.

36. A wheel assembly portion of a vehicle having a vehicle wheel with a hub assembly and a tensioning rod assembly having a tensioning device and a tensioning rod that includes at least one of a projection or a recession along a radial direction of the tensioning rod, the wheel assembly portion comprising:
 an arm assembly including a first arm and a second arm, a first through-hole in the first arm, and a second through-hole in the second arm, wherein each through-hole is transverse to a longitudinal axis of the corresponding arm and the first arm includes a first slot and the second arm includes a second slot, wherein each slot is disposed on an inboard face of the corresponding arm and is adjacent to the corresponding arm's through-hole;
 wherein the tensioning device includes a tension-release lever that is configured and arranged to rotate about a lever axis that is substantially transverse to an axis of the tensioning rod, wherein rotating the tension-release lever about the lever axis selectively applies a clamping force from the tensioning device to at one of the first arm or the second arm;
 wherein the hub assembly includes a hub, a first end cap, and a second end cap, the first end cap having a first outer face that engages with the first slot of the first arm and the second end cap having a second outer face that engages with the second slot of the second arm;
 wherein the at least one of the projection or the recession of the tensioning rod is engaged with at least another portion of the tensioning rod assembly when a relative angle between the tensioning rod and the other portion of the tensioning assembly is at a first angle and the at least one of the projection or the recession is disengaged with the other portion of the assembly when the relative angle is at a second angle;
 wherein the tensioning rod extends through at least one of the arm assembly through-holes, at least one of the end caps, and the hub to clamp the hub into place between a first end of the first arm and a second end of the second arm when the relative angle is oriented at the first angle; and
 wherein the wheel is removable from the arm assembly by removal of the tensioning rod and sliding at least a portion of the hub assembly, including at least one of the end caps out of the corresponding slot of the first or the second arm when the relative angle is oriented at the second angle.

37. The wheel assembly portion of claim 36, wherein the hub includes an axle, and wherein at least one of the end caps is nesting over an end portion of the axle, the outer face of the at least one end cap is extending at least as far outwardly as the axle.

38. The wheel assembly portion of claim 36, wherein the hub includes an axle, and wherein at least one of the end caps is nesting over an end portion of the axle, the axle extending outwardly further than the at least one end cap to engage with a portion of the first or the second arm.

39. The wheel assembly portion of claim 36, wherein the arm assembly is a front fork assembly, the through-holes extend through lower ends of the fork assembly, and the slots extend forward relative to the fork assembly.

40. The wheel assembly portion of claim 36, wherein the arm assembly is a rear wheel arm assembly that extends rearwardly from a mid portion of the vehicle.

41. The wheel assembly portion of claim 36, wherein the other portion of the tensioning rod assembly includes a rotatable fastener, the rotatable fastener includes a protrusion on an outer circumference of the rotatable fastener and at least one of the first arm or the second arm includes a circumferential channel on an outboard side of a lower portion of the at least one of the first or the second arm, the protrusion of the outer circumference of the rotatable fastener is located within the circumferential channel and limits the rotatable fastener to a predetermined amount of rotation.

42. The wheel assembly portion of claim 36, wherein at least one of the first arm or the second arm includes a circumferential channel on an outboard side of a lower portion of the at least one of the first or the second arm, wherein the tensioning rod assembly includes a housing with a protrusion located on an outer surface of the housing, wherein the protrusion on the housing rides along the circumferential channel, the protrusion is located within the circumferential channel and limits a rotatable fastener to a predetermined amount of rotation.

43. The wheel assembly portion of claim 42, wherein the circumferential channel is formed by a plurality of tabs that are spaced apart on an outer face of the first or the second arm and is adjacent to the corresponding through-hole.

44. A portion of a bicycle comprising:
 a wheel mounting assembly including a right and a left arm for securing a right and a left side of a bicycle wheel;
 a hub assembly;
 a tension rod assembly that includes a thumbnut, a skewer shaft, and an adjusting mechanism located between the thumbnut and the skewer shaft, wherein the adjusting mechanism includes a cylinder having right-hand threads on one side and left-hand threads on the opposite side; and
 a quick-release assembly;
wherein the tension rod assembly is selectively engagable to at least one of the quick-release assembly or the thumbnut; and
wherein portions of the tension rod assembly are capable of being removed from the at least one of the quick-release assembly or the thumbnut and from the wheel mounting assembly by turning at least one of the thumbnut and the quick-release assembly a partial turn.

45. A portion of a bicycle comprising:
 a wheel mounting assembly including a right and a left arm for securing a right and a left side of a bicycle wheel;
 a hub assembly;

a tension rod assembly that includes a thumbnut, a skewer shaft, and an adjusting mechanism located between the thumbnut and the skewer shaft; and a quick-release assembly that includes an array of teeth engagable with other teeth extending along an axis of the skewer shaft; and a stop member to locate an end of the skewer shaft such that the array of teeth are aligned with the other teeth for engagement; and wherein the tension rod assembly is selectively engagable to at least one of the quick-release assembly or the thumbnut; and wherein portions of the tension rod assembly are capable of being removed from the at least one of the quick-release assembly or the thumbnut and from the wheel mounting assembly by turning at least one of the thumbnut and the quick-release assembly a partial turn.

46. A portion of a bicycle comprising:
a wheel mounting assembly including a right and a left arm for securing a right and a left side of a bicycle wheel;
a hub assembly;
a tension rod assembly that includes a thumbnut and a tension member; and
a quick-release assembly;
wherein the tension rod assembly is selectively engagable to at least one of the quick-release assembly or the thumbnut;
wherein portions of the tension member assembly are capable of being removed from the at least one of the quick-release assembly or the thumbnut and from the wheel mounting assembly by turning at least one of the thumbnut and the quick-release assembly a partial turn and
wherein the tension rod assembly includes at least one toothed portion and at least one non-toothed portion circumferentially adjacent to the toothed portion and recessed radially from the toothed portion, such that the tension member is capable of being engaged to portions of a partially internally toothed cylinder by aligning the portions on the end portion of the tension member with opposing engagement portions in a bore of the partially internally toothed cylinder, and the tension member is capable of being removed from the cylinder by aligning the recessed portion on the end portion of the tension member with the toothed portions in the bore of the cylinder.

47. A tensioning system for securing a bicycle wheel to dropouts of a bicycle having a fork assembly with a first and a second fork leg and a rear frame member with at least one rear arm, the wheel having a hub assembly, the tensioning system comprising:
an end nut securable to at least one side of the dropouts;
a quick-release device including a quick-release lever and positionable on one side of the dropouts opposite the end nut;
a tensioning member having an engagement portion on a first end and a second end opposite the first end, wherein the second end is coupled to a cam follower, the cam follower being coupled to the quick-release device for axial movement of the tensioning member relative to the quick-release device;
wherein the tensioning member is selectively engagable through the dropouts; and
wherein the tensioning member is capable of being removed from the dropouts by turning the quick-release lever a portion of a turn relative to the end nut.

48. A tensioning system for securing a bicycle wheel to dropouts of a bicycle having a fork assembly with a first and a second fork leg and a rear frame member with at least one rear arm, the wheel having a hub assembly, the tensioning system comprising:
a tensioning member having an engagement portion on a first end and a second end opposite the first end;
an end nut securable to at least one side of the dropouts;
a quick-release device positionable on one side of the dropouts opposite the end nut;
wherein the tensioning member is selectively engagable through the dropouts;
wherein the tensioning member is capable of being removed from the dropouts by turning a quick-release lever a portion of a turn relative to the end nut; and
wherein the first end portion of the tensioning member is selectively engagable with the quick-release device, the second end being coupled to the end nut, the engagement portion of the tensioning member having circumferential engaging members that extend circumferentially around a portion of a side of the engagement portion of the tensioning member and over a portion of the length of the engagement portion, the tensioning member also having at least one recessed portion circumferentially adjacent the engagement portion, the quick-release device having an engagement portion selectively mateable with the engagement portion of the tensioning member.

49. A dropout portion of a bicycle having a bicycle wheel with a hub assembly and a QR tensioning rod assembly having a QR and a tensioning rod, the dropout portion comprising:
an arm assembly including a first arm and a second arm; the arm assembly including through-holes in the first and second arms, the through-holes being transverse to a longitudinal axis of the arms, each arm including a slot in an inboard face adjacent the through-holes and at least one of the first arm and the second arm includes a circumferential channel on an outboard side of a lower portion of the arm;
wherein the hub assembly includes first and second end caps, the end caps having outer faces that engage within one of the slots of the first and second arms;
wherein the QR tensioning rod assembly extends through the arm assembly through-holes, the end caps, and the hub assembly to clamp the hub into place between the ends of the first and second arms and the QR assembly includes a housing with a protrusion located on an outer surface of the housing;
wherein the protrusion located within the circumferential channel guiding the thumbnut to a predetermined limited amount of rotation;
wherein the circumferential channel is created by tabs spaced apart on an outer face of the arms adjacent the through-hole; and
wherein the wheel is removable from the arm assembly by removal of the tensioning rod and sliding the hub and end caps out of the slots of the first and second arms.

50. A tensioning system for coupling a first device to a mounting assembly, wherein the mounting assembly includes a first side and a second side, the tensioning system comprising:
a tensioning member having an engagement portion on a first end and a second end opposite the first end;
a receiving end positioned on the first side of the mounting assembly that is configured and arranged to receive the engagement portion of the tensioning member; and
a tension-release device positionable outboard of the second side of the mounting assembly such that the second side of the mounting assembly is intermediate the first side of the mounting assembly and the tension-release device, wherein the tension-release device is configured and arranged for an open position and a closed position, wherein when the tension-release device is in the closed position, a clamping force prevents the tensioning member from rotating relative to the receiving end and when the tension-release device is in the open position, the tensioning member is rotatable relative to the receiving end by at least a partial turn.

51. The tensioning system of claim 50, wherein transitioning the tension-release device from the open to the closed position translates the tensioning member along a longitudinal axis of the tensioning member.

52. The tensioning system of claim 50, further comprising a protrusion that when the first device is coupled to the mounting assembly, the protrusion is located within a circumferential recess of the mounting assembly and when the tension-release device is in the open position, the circumferential recess prevent excessive rotation of the tensioning member.

53. The tensioning system of claim 50, wherein the circumferential recess is on the first side of the mounting assembly.

54. The tensioning system of claim 50, wherein the circumferential recess is on the second side of the mounting assembly.

55. The tensioning system of claim 50, wherein the mounting assembly is a wheel mounting assembly.

56. The tensioning system of claim 50, wherein the first device is a wheel.

57. The tensioning system of claim 50, wherein the tensioning member is included with a vehicle.

58. The tensioning system of claim 50, wherein when the tension-release device is in the closed position, the tension-release device is prevented from rotating relative to the mounting assembly and when the tension-release device is in the open position, the tension-release device is rotatable relative to the mounting assembly by at least a partial turn.

59. A first device comprising:
a mounting assembly for coupling a second device to the first device;
a tension rod assembly including a rotatable fastener and at least one of a projection or a recession along a radial direction of the tension rod; and
a tension-release assembly that includes a cam that rotates about a cam axis that is substantially transverse the an axis of the tension rode;
wherein the at least one of the projection or the recession of the tension rod assembly is selectively engaged to at least one of the tension-release assembly or the rotatable fastener when a relative angle between the tension rod assembly and the at least one of the tension-release assembly or the rotatable fastener is at a first angle and the at least one of the projection or the recession of disengaged when the relative angle is at a second angle wherein when the cam is rotated about the cam axis to a first cam angle, a clamping force is provided between the first and the second device, and when the cam is rotated about the cam axis to a second cam angle, the clamping force between the first and the device is released.

60. The first device of claim 59, wherein portions of the tension rod assembly are disengaged from the at least one of the tension-release assembly or the rotatable fastener and is removable from the mounting assembly when at least the relative angle between the tension rod assembly and the at least one of the rotatable fastener or the tension-release assembly is oriented at the second angle.

61. The portion of the vehicle of claim 59, wherein the mounting assembly is a wheel mounting assembly.

62. The portion of the vehicle of claim 59, wherein the second device is a wheel.

63. The portion of the vehicle of claim 59, wherein the first device is included on a vehicle.

64. The portion of the vehicle of claim 59, wherein the mounting assembly is a bicycle fork.

* * * * *